(12) United States Patent
Nishizawa

(10) Patent No.: US 11,493,453 B2
(45) Date of Patent: Nov. 8, 2022

(54) BELT INSPECTION SYSTEM, BELT INSPECTION METHOD, AND RECORDING MEDIUM FOR BELT INSPECTION PROGRAM

(71) Applicant: KYOCERA Document Solutions Inc., Osaka (JP)

(72) Inventor: Akira Nishizawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 243 days.

(21) Appl. No.: 16/911,577

(22) Filed: Jun. 25, 2020

(65) Prior Publication Data

US 2020/0408697 A1 Dec. 31, 2020

(30) Foreign Application Priority Data

Jun. 28, 2019 (JP) ............................. JP2019-120851
Jun. 28, 2019 (JP) ............................. JP2019-120852

(51) Int. Cl.
*G01N 21/88* (2006.01)
*G01N 21/95* (2006.01)
(Continued)

(52) U.S. Cl.
CPC ......... *G01N 21/8851* (2013.01); *G01N 21/95* (2013.01); *G06T 5/002* (2013.01); (Continued)

(58) Field of Classification Search
CPC .............. G01N 21/8851; G01N 21/95; G01N 2021/8874; G01N 2021/8887; G06T 5/002; G06T 7/0004
See application file for complete search history.

(56) References Cited

U.S. PATENT DOCUMENTS 4,520,702 A * 6/1985 Davis ...................... G01N 21/88 83/337
6,778,694 B1 * 8/2004 Alexandre ......... G01N 21/8903 348/125
(Continued)

FOREIGN PATENT DOCUMENTS

CN 108520274 B * 3/2022 ........... G06K 9/6218
EP 1703274 A1 * 9/2006 ........... G01N 21/952
(Continued)

OTHER PUBLICATIONS

C. Chen and G. T.-. Chiu, "Banding Artifact Reduction for a Class of Color Electrophotographic Printers With Underactuated Motor/Gear Configuration," in IEEE Transactions on Control Systems Technology, vol. 16, No. 4, pp. 577-588, Jul. 2008, doi: 10.1109/TCST.2007.912108. (Year: 2008).*
(Continued)

*Primary Examiner* — Michael Robert Cammarata
(74) *Attorney, Agent, or Firm* — Lex IP Meister, PLLC

(57) ABSTRACT

A belt inspection system to detect a belt defect of an intermediate transfer belt of an image forming apparatus using a first belt image obtained by photographing the intermediate transfer belt, performs a preprocessing on the first belt image to generate a second belt image, detects a candidate for the belt defect from the second belt image, and performs, in the preprocessing, a noise removal processing to remove a specific noise included in the first belt image, the specific noise including a noise caused by the photographing, a noise of a specific size based on an average size of the belt defect, and a band-shaped or streak-shaped noise extending in the width direction of the intermediate transfer belt.

9 Claims, 27 Drawing Sheets

(51) Int. Cl.
*G06T 7/00* (2017.01)
*G06T 5/00* (2006.01)

(52) U.S. Cl.
CPC .... *G06T 7/0004* (2013.01); *G01N 2021/8887* (2013.01); *G06T 2207/30164* (2013.01)

(56) References Cited

U.S. PATENT DOCUMENTS

| | | | | |
|---|---|---|---|---|
| 2014/0112676 | A1* | 4/2014 | Mori | G03G 15/04045 399/49 |
| 2014/0153942 | A1* | 6/2014 | Tokoro | G03G 15/1615 399/302 |
| 2015/0139703 | A1* | 5/2015 | Takazawa | G03G 15/1615 399/302 |
| 2018/0347972 | A1* | 12/2018 | Tadokoro | G01B 11/303 |
| 2018/0354169 | A1* | 12/2018 | Shirakawa | G01N 21/95 |
| 2018/0357757 | A1* | 12/2018 | Kuwasako | G01N 21/8851 |
| 2020/0116650 | A1* | 4/2020 | Loken | G06T 7/0004 |
| 2020/0234417 | A1* | 7/2020 | Cohen | G06T 5/002 |
| 2021/0279848 | A1* | 9/2021 | Greenberg | G06T 7/77 |
| 2021/0326621 | A1* | 10/2021 | Allebach | H04N 1/4097 |
| 2021/0372937 | A1* | 12/2021 | Nishizawa | G03G 15/1615 |
| 2022/0084181 | A1* | 3/2022 | Isken | G01N 21/8851 |
| 2022/0092757 | A1* | 3/2022 | Zhou | G06V 10/12 |

FOREIGN PATENT DOCUMENTS

| | | | | |
|---|---|---|---|---|
| JP | H09318338 | A * | 12/1997 | |
| JP | H11274254 | A | 10/1999 | |
| JP | 2003044832 | A * | 2/2003 | |
| JP | 2008180586 | A * | 8/2008 | |
| JP | 4225579 | B2 * | 2/2009 | ......... G01N 21/8903 |
| JP | 2009078289 | A * | 4/2009 | |
| JP | 2010078496 | A * | 4/2010 | |
| JP | 2012-014108 | | 1/2012 | |
| JP | 2012014108 | A * | 1/2012 | |
| JP | 2013076883 | A * | 4/2013 | |
| JP | 2020184011 | A * | 11/2020 | |
| JP | 2021189239 | A * | 12/2021 | ......... G01N 21/8851 |
| JP | 7027878 | | * 2/2022 | |
| WO | WO-2017130477 | A1 * | 8/2017 | |
| WO | WO-2019037490 | A1 * | 2/2019 | ............... G02F 1/13 |

OTHER PUBLICATIONS

T. Qiao and J. Zhang, "A Research of Image Identification Signal Processing for Longitudinal Rip of the Transport Belt," 2010 International Conference on Optoelectronics and Image Processing, 2010, pp. 100-103, doi: 10.1109/ICOIP.2010.297. (Year: 2010).*
F. Zeng and S. Zhang, "A method for determining longitudinal tear of conveyor belt based on feature fusion," 2019 6th International Conference on Information Science and Control Engineering (ICISCE), 2019, pp. 65-69, doi: 10.1109/ICISCE48695.2019.00023. (Year: 2019).*
Xiang, Xiaoyu, Renee Jessome, Eric Maggard, Yousun Bang, Minki Cho, and Jan Allebach. "Blockwise based detection of local defects." Electronic Imaging 2019, No. 10 (2019): 303-1. (Year: 2019).*

* cited by examiner

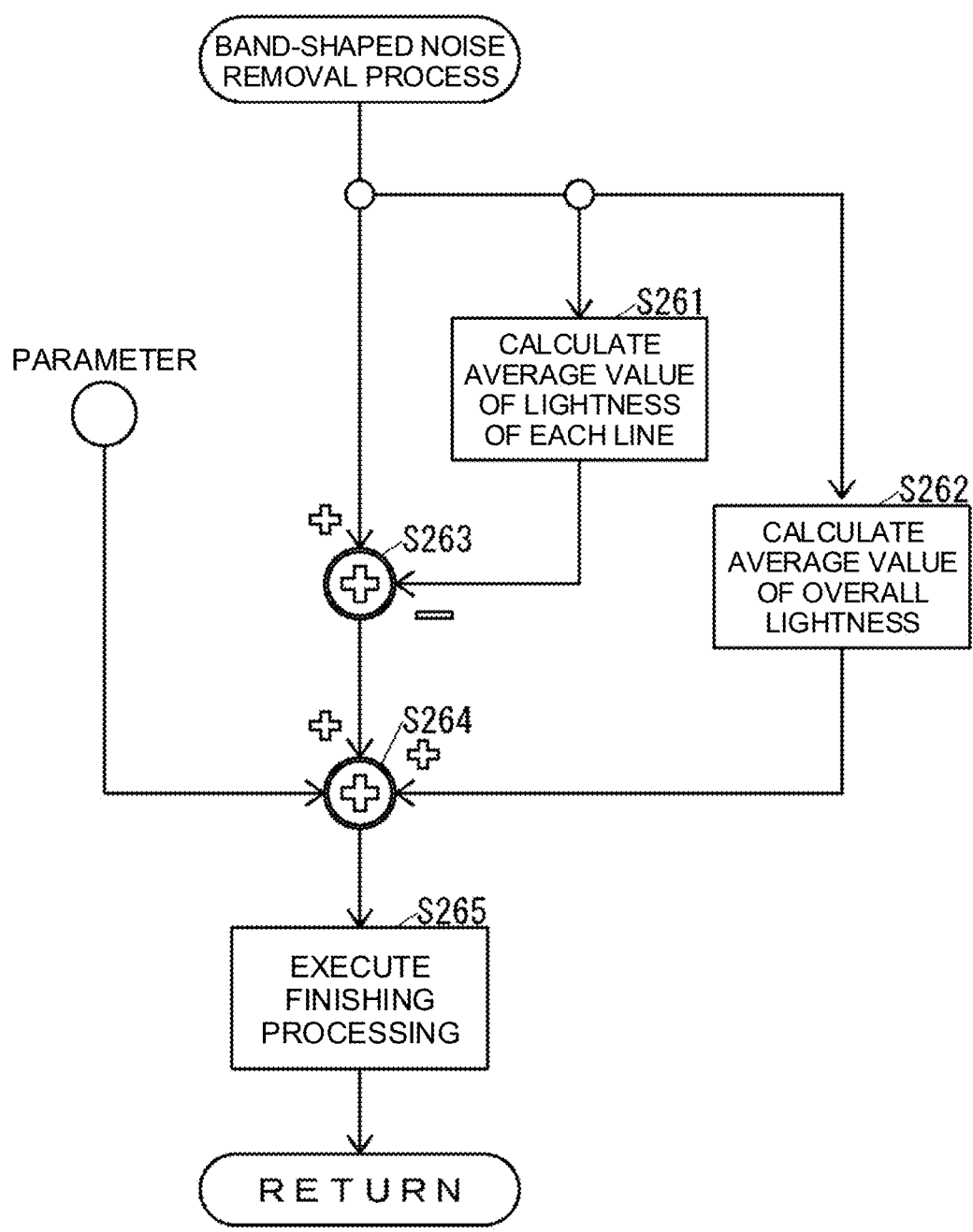

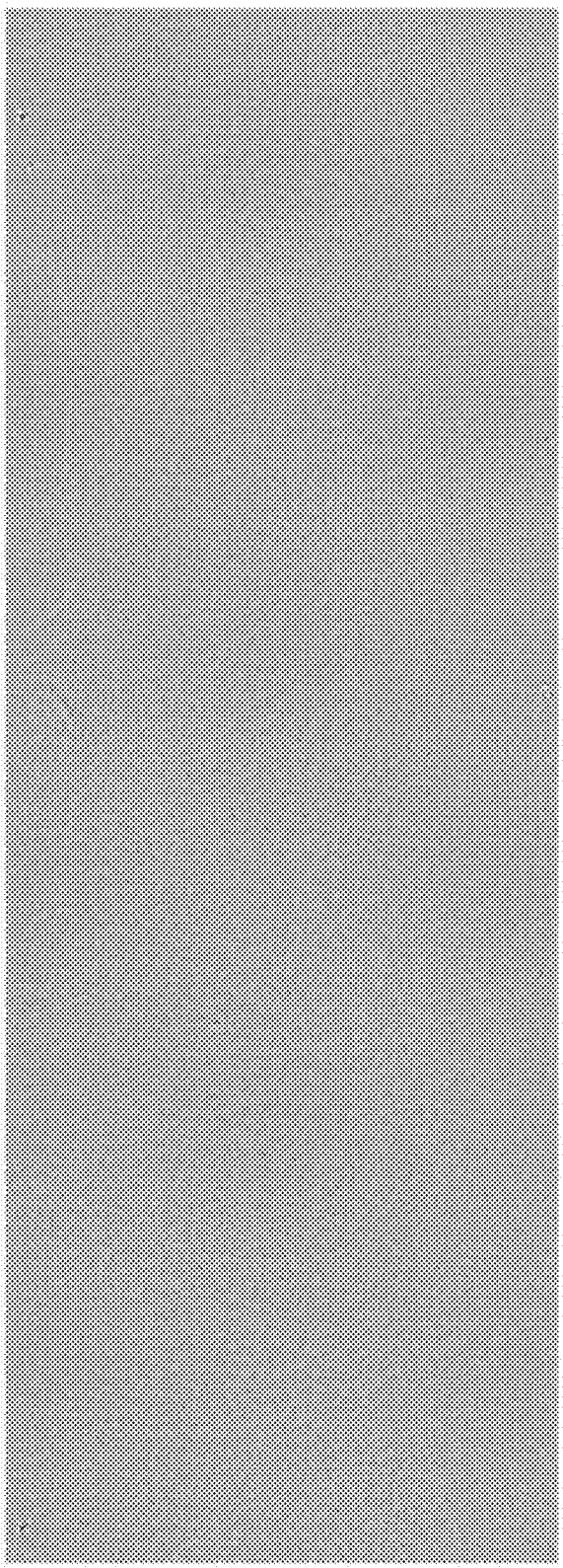

BELT INSPECTION SYSTEM, BELT INSPECTION METHOD, AND RECORDING MEDIUM FOR BELT INSPECTION PROGRAM

INCORPORATION BY REFERENCE

This application is based upon, and claims the benefit of priority from, corresponding Japanese Patent Application No. 2019-120851 and No. 2019-120852 filed in the Japan Patent Office on Jun. 28, 2019, the entire contents of which are incorporated herein by reference.

BACKGROUND

Field of the Invention

The present disclosure relates to a belt inspection system, a belt inspection method, and a recording medium for a belt inspection program for detecting an abnormal portion (hereinafter referred to as a "belt defect") of an intermediate transfer belt of an image forming apparatus.

Description of Related Art

As a conventional belt inspection system, there is known a system in which the surface of an intermediate transfer belt is optically read by an imaging device and a belt defect is automatically detected on the basis of the reading result.

However, the conventional belt inspection system has a problem that the belt defect cannot be detected with high accuracy.

SUMMARY

A belt inspection system of the present disclosure is a belt inspection system to detect a belt defect as an abnormal portion of an intermediate transfer belt of an image forming apparatus on a basis of a first belt image obtained by photographing the intermediate transfer belt, and includes a defect candidate detector configured to perform a preprocessing on the first belt image and detects a candidate for the belt defect from a second belt image on which the preprocessing is performed. The preprocessing includes a noise removal processing for removing a noise caused by at least photographing of the intermediate transfer belt, and the noise removal processing includes a processing for removing a noise caused by the photographing, a noise of a specific size, from the first belt image in accordance with a standard size of the belt defect.

In the belt inspection system of the present disclosure, the noise removal processing may further include a processing for removing a noise that extends in a width direction of the intermediate transfer belt and is caused by a production process of the intermediate transfer belt. In this case, the noise removal processing obtains, from the first belt image, an equivalent image as a belt image equivalent to a belt image obtained by photographing the intermediate transfer belt in a normal viewing state, and removes, from the equivalent image, a band-shaped noise or a streak-shaped noise extending in the width direction of the intermediate transfer belt.

In the belt inspection system of the present disclosure, in order to obtain the equivalent image, the first belt image may be subjected to provisional shear deformation at a provisional correction angle as an angle for provisional correction, an inclination angle of a portion of the intermediate transfer belt may be specified from a plurality of the provisional correction angles on a basis of a lightness value for each line of the first belt image subjected to provisional shear deformation, and shear deformation may be performed on the first belt image in accordance with the specified inclination angle.

The belt inspection system of the present disclosure may include a pass/fail determiner configured to determine pass/fail of quality of the intermediate transfer belt in accordance with a learning model for the candidate detected by the defect candidate detector.

The belt inspection system of the present disclosure may include a learning model generator configured to generate the learning model with a use of the candidate detected by the defect candidate detector.

A belt inspection method of the present disclosure is a belt inspection method for detecting a belt defect as an abnormal portion of an intermediate transfer belt on the basis of a first belt image obtained by photographing the intermediate transfer belt of an image forming apparatus, and includes performing a preprocessing on the first belt image and detecting a candidate for the belt defect from a second belt image on which the preprocessing is performed. The preprocessing includes a noise removal processing for removing a noise caused by at least photographing of the intermediate transfer belt, and the noise removal processing removes, a noise caused by the photographing, a noise of a specific size, from the first belt image, in accordance with a standard size of the belt defect.

A computer-readable recording medium of the present disclosure stores a belt inspection program configured to cause a computer to execute the abovementioned belt inspection method.

BRIEF DESCRIPTION OF THE DRAWINGS

FIG. 30 is a flowchart of a band-shaped noise removal process illustrated in FIG. 24; and FIG. 31 is a diagram illustrating an example of a belt image obtained by processing the belt image illustrated in FIG. 29B in the band-shaped noise removal process.

DETAILED DESCRIPTION

The following describes embodiments of the present disclosure with the use of the accompanying drawings.

First, an intermediate transfer belt according to the present embodiment will be described.

In a color image forming apparatus, a part called an intermediate transfer belt to which a charged toner is attached is used.

For example, when the image forming apparatus is an A3 machine, the intermediate transfer belt has a cylindrical shape having a width of, for example, approximately 330 mm, which is slightly larger than 297 mm which is the length in the lateral direction of a A3 size recording medium, and has a perimeter of, for example, approximately 850 mm, which is slightly larger than twice the length in the longitudinal direction of a A3 size recording medium, which is 420 mm.

There are several manufacturing methods for the intermediate transfer belt. For example, the intermediate transfer belt is manufactured by extrusion molding from the viewpoint of manufacturing cost. Similarly, from the viewpoint of manufacturing cost, the intermediate transfer belt is often manufactured by dispersing carbon in a resin to adjust the electric resistance of a semiconductor region. When the intermediate transfer belt is manufactured by dispersing carbon in a resin, it often has a dark appearance such as black or blackish brown in terms of lightness.

The intermediate transfer belt is an electronically very delicate part in which charged toner is repeatedly attached and removed, and it is very sensitive to surface protrusions, scratches, and deformation. For example, even if there is a deformation having a diameter of several mm and a height of several tens of μm on the surface of the intermediate transfer belt, it affects a toner adhesion state, and as a result, deteriorates the quality of an image printed on a recording medium by the image forming apparatus.

Therefore, it is desired that a belt defect as an abnormal portion of the intermediate transfer belt can be detected with high accuracy. Here, the belt defect often has a diameter of about 2 to 3 mm and a height of approximately 10 to 30 μm.

Next, a belt inspection process for inspecting the intermediate transfer belt will be described.

Figure 1:
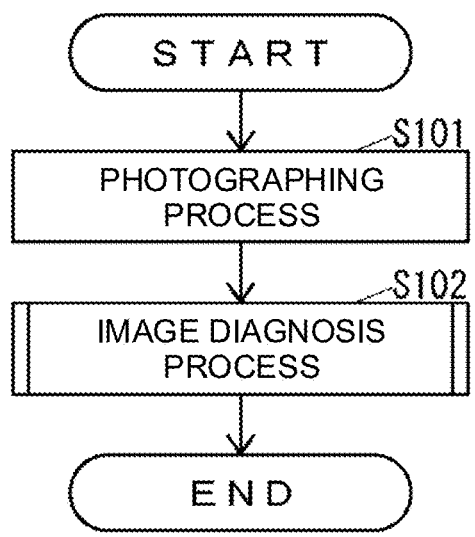
FIG. 1 is a flowchart of a belt inspection process according to an embodiment of the present disclosure.

FIG. 1 is a flowchart of a belt inspection process according to the present embodiment.

As illustrated in FIG. 1, an image-based abnormality diagnosis of an intermediate transfer belt includes a photographing process for photographing the intermediate transfer belt (S101) and an image diagnosis process (S102) for diagnosing the abnormality of the intermediate transfer belt on the basis of an image (hereinafter referred to as a "belt image") of the intermediate transfer belt obtained by the photographing process of S101.

Figure 2:
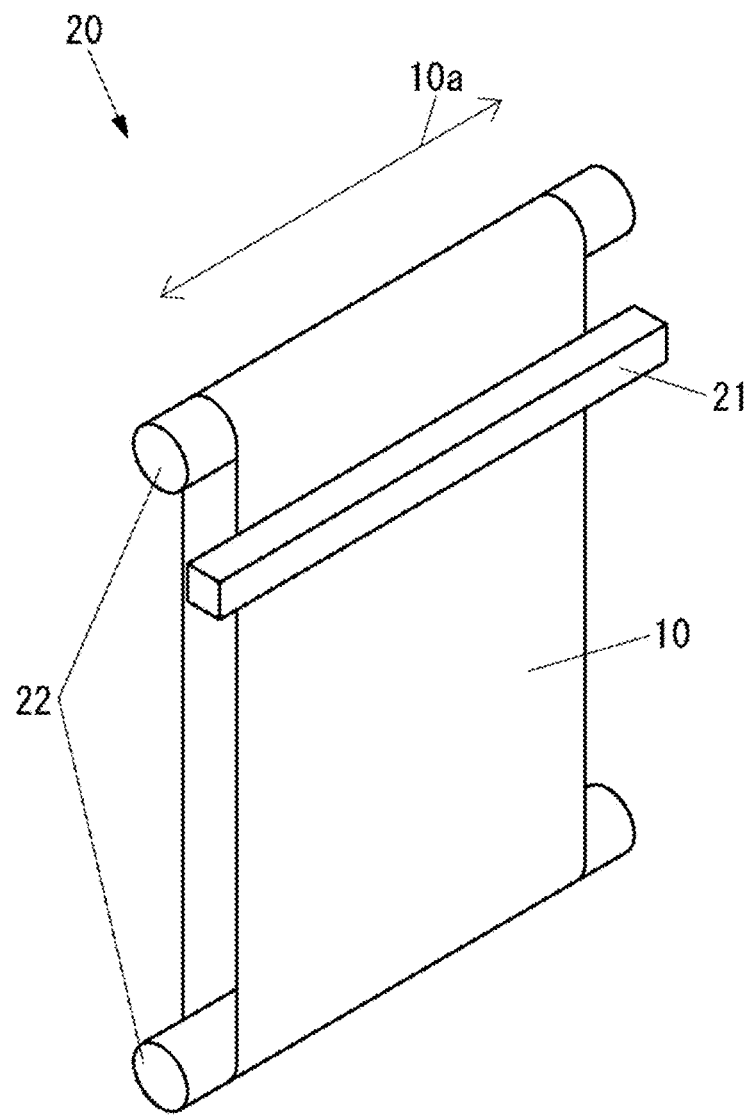
FIG. 2 is a diagram illustrating an example of an image pickup system that photographs an intermediate transfer belt in a photographing process illustrated in FIG. 1.

FIG. 2 is a diagram illustrating an example of an image pickup system 20 that photographs an intermediate transfer belt 10 in the photographing process of S101.

As illustrated in FIG. 2, the image pickup system 20 includes an imaging device 21 such as a line sensor that photographs an image of the intermediate transfer belt 10, and a belt moving device 22 that moves the intermediate transfer belt 10 with respect to the imaging device 21. The imaging device 21 is preferably installed parallel to the width direction of the intermediate transfer belt 10 indicated by an arrow 10a.

Since the angle-of-view size of the imaging device is usually set to be larger than the width of the intermediate transfer belt, as a matter of course, in the end portion of the intermediate transfer belt, a non-belt portion other than a belt portion also appears. However, since the non-belt portion is not the inspection target region for a belt defect, it is removed from a processing target by cutting it off or masking it.

The photographed image of the intermediate transfer belt 10 by the photographing process of S101 has a length in a direction corresponding to the circumferential direction of the intermediate transfer belt 10 longer than one perimeter length of the intermediate transfer belt 10. That is, the photographed image has overlapping portions at both ends in the direction corresponding to the circumferential direction of the intermediate transfer belt 10.

Figure 3:
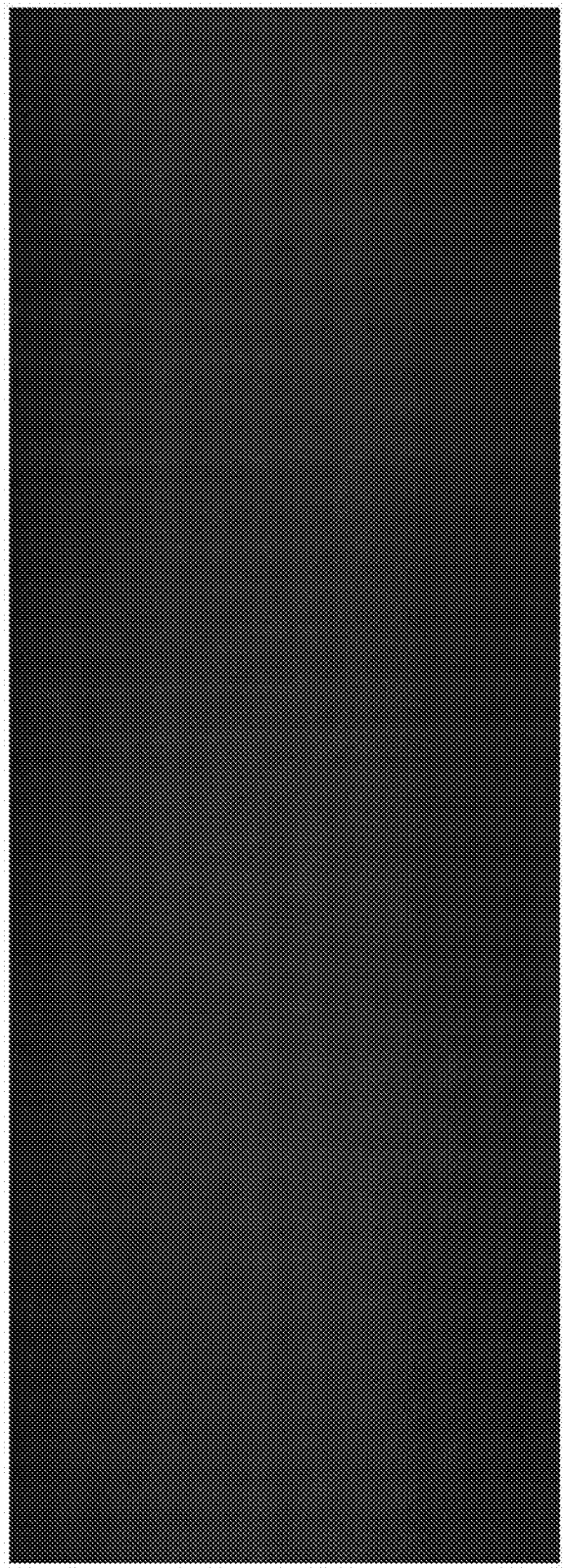
FIG. 3 is a diagram illustrating an example of a belt image photographed by the photographing process illustrated in FIG. 1.
Figure 4:
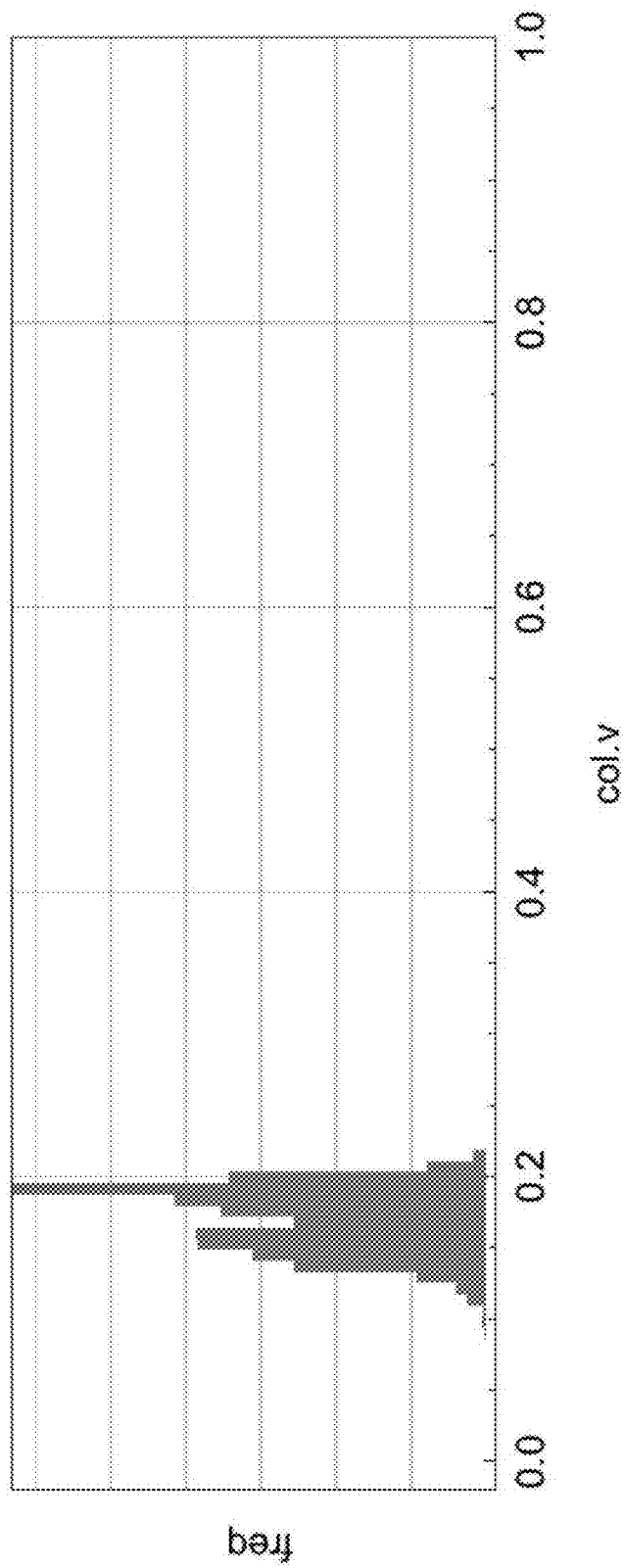
FIG. 4 is a graph illustrating a histogram distribution of the lightness of the belt image illustrated in FIG. 3.

FIG. 3 is a diagram illustrating an example of a belt image 41 photographed by the photographing process of S101. FIG. 4 is a graph illustrating a histogram distribution of the lightness of the belt image 41.

As illustrated in FIGS. 3 and 4, the unprocessed belt image 41 just output from the imaging device usually has low lightness and a narrow lightness range, and the surface details of the intermediate transfer belt are not clear.

Figure 5:
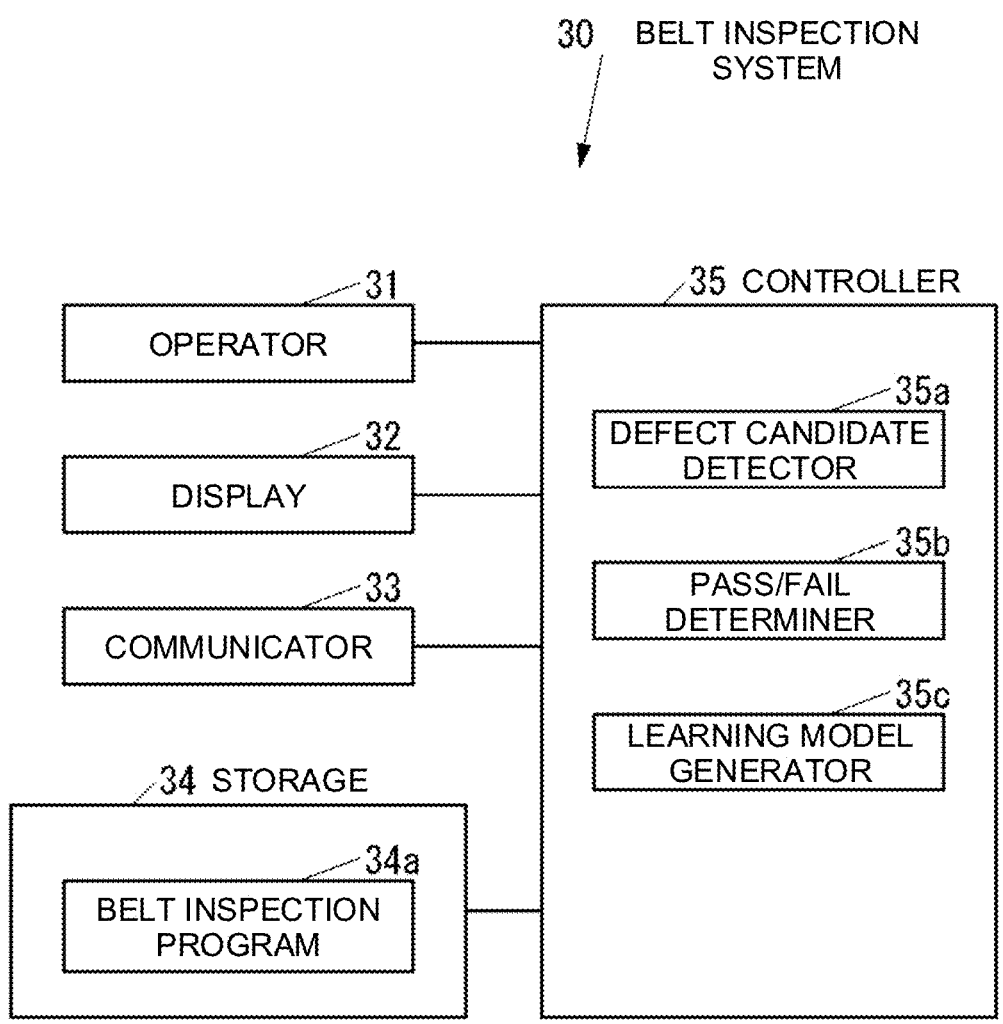
FIG. 5 is a block diagram of a belt inspection system when implemented by one computer.

The image diagnosis process illustrated in FIG. 1 is executed by a belt inspection system 30 illustrated in FIG. 5.

FIG. 5 is a block diagram of the belt inspection system 30 when implemented by one computer.

The belt inspection system 30 illustrated in FIG. 5 includes an operator 31 which is an operation device such as a keyboard and a mouse, a display 32 which is a display device such as a liquid crystal display (LCD) that displays various information, a communicator 33 which is a communication device that communicates with an external device via a network such as a local area network (LAN) or the Internet, or directly by wire or wirelessly without using the network, a storage 34 which is a non-volatile storage device such as a semiconductor memory or a hard disk drive (HDD) that stores various information, and a controller 35 which controls the entire belt inspection system 30.

The storage 34 stores a belt inspection program 34a for detecting a belt defect. The belt inspection program 34a may be installed in the belt inspection system 30 at the manufacturing stage of the belt inspection system 30, or may be additionally installed in the belt inspection system 30 from an external storage medium such as a compact disk (CD), a digital versatile disk (DVD), and a universal serial bus (USB) memory, or may be additionally installed in the belt inspection system 30 from the network.

The controller 35 includes, for example, a central processing unit (CPU), a read only memory (ROM) that stores programs and various kinds of data, and a random access memory (RAM) as a memory used for the work area of the CPU of the controller 35. The CPU of the controller 35 executes the program stored in the storage 34 or the ROM of the controller 35.

By executing the belt inspection program 34a, the controller 35 implements a defect candidate detector 35a that detects a belt defect candidate from a belt image, a pass/fail determiner 35b that determines pass/fail of quality of the intermediate transfer belt in accordance with a learning model with respect to the belt defect candidate detected by the defect candidate detector 35a, and a learning model generator 35c that generates a learning model with the use of the belt defect candidate detected by the defect candidate detector 35a.

In addition, in FIG. 5, the belt inspection system 30 is implemented by one computer. However, the belt inspection system 30 may be implemented by a plurality of computers.

Figure 6:
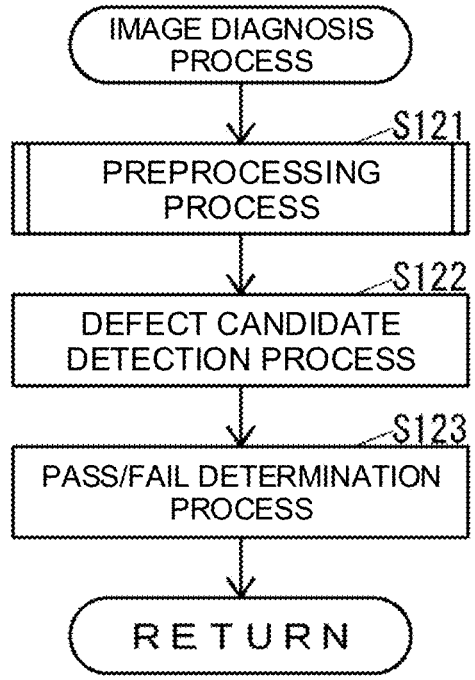
FIG. 6 is a flowchart of an image diagnosis process illustrated in FIG. 1.

FIG. 6 is a flowchart of the image diagnosis process illustrated in FIG. 1.

As illustrated in FIG. 6, the image diagnosis process of S102 (see FIG. 1) includes a preprocessing process (S121) for preprocessing a belt image for detecting a belt defect candidate, a defect candidate detection process (S122) for detecting a belt defect candidate on the basis of the belt image that has been preprocessed in the preprocessing process of S121, and a pass/fail determination process (S123) for determining pass/fail for the belt defect candidate extracted in the defect candidate detection process of S122.

Figure 7:
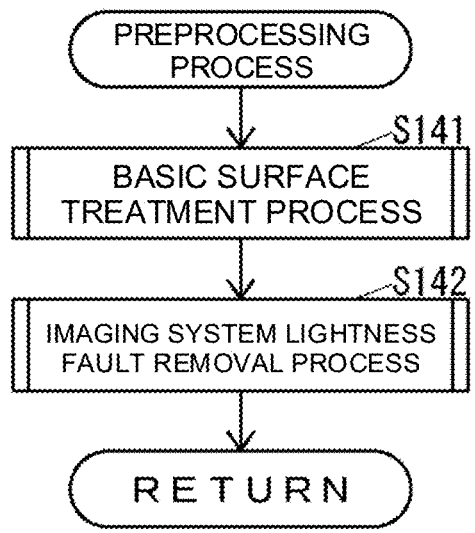
FIG. 7 is a flowchart of a preprocessing process illustrated in FIG. 6.

FIG. 7 is a flowchart of the preprocessing process illustrated in FIG. 6.

As illustrated in FIG. 7, in the preprocessing process of S121 (see FIG. 6) includes a basic surface treatment process (S141) for performing basic surface treatment, on the belt image obtained by the photographing process of S101, for extracting a belt defect in the subsequent processes, and an imaging system lightness fault removal process (S142) for removing from the belt image a component that affects the lightness of the belt image, which is assumed to be mixed during the photographing in the photographing process of S101 irrespective of the surface condition of the intermediate transfer belt.

Figure 8:
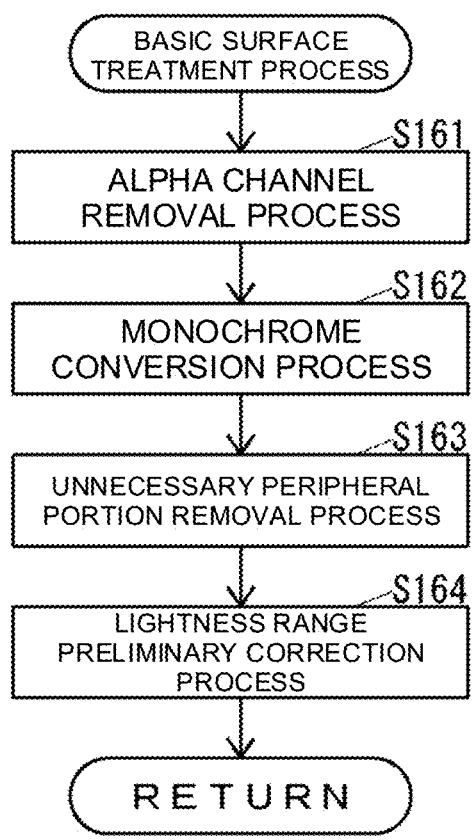
FIG. 8 is a flowchart of a basic surface treatment process illustrated in FIG. 7.

FIG. 8 is a flowchart of the basic surface treatment process illustrated in FIG. 7.

As illustrated in FIG. 8, the basic surface treatment process of S141 (see FIG. 7) includes, for example, an alpha channel removal process (S161) for removing an alpha channel and an effect of the alpha channel from the belt image, a monochrome conversion process (S162) for converting the belt image with full-color into a monochrome image, an unnecessary peripheral portion removal process (S163) for trimming a non-belt portion that enters the upper and lower edges or the left and right edges of the belt image due to the photographing range of the imaging device or a belt portion affected by the surrounding non-belt portion and further trimming or supplementing in order to unify the image size after trimming, and a lightness range preliminary correction process (S164) for preliminarily correcting the lightness range in order to make it easy for a human to observe the surface condition of the intermediate transfer belt and to make it easy for the belt inspection system 30 to detect minute changes.

If the non-belt portion is accurately removed in the unnecessary peripheral portion removal process of S163, the lightness of the non-belt portion does not affect the correction of the lightness range in the lightness range preliminary correction process of S164. Therefore, in order to more appropriately correct the lightness range in the lightness range preliminary correction process of S164, the unnecessary peripheral portion removal process of S163 is performed before the lightness range preliminary correction process of S164.

The unnecessary peripheral portion removal process of S163 will be described.

In the photographing of the intermediate transfer belt, when the angle-of-view of the imaging device is set wider than the width of the intermediate transfer belt, the non-belt portion is often reflected on the left and right edges of an image. In the processing for correcting the lightness of a belt image, when the correction is performed without removing a non-belt portion, the effect cannot be ignored depending on the area and color value of the non-belt portion. Therefore, the non-belt portion is carefully trimmed in advance, or masked to be removed from an analysis target.

If the image size is slightly different for each belt image, it becomes difficult to perform the image processing. Therefore, if this is to be avoided, the image edge may be further trimmed or a padding processing may be performed so as to obtain a specified size. For example, in the padding processing, the lightness of the outermost shell pixel of the belt image after the unnecessary portion is trimmed may be applied, or the average lightness value of a belt portion may be applied.

An example of the size of the belt image will be described. When the imaging device is a 2K camera and the size of the belt image is 2048 pixels×4792 pixels before the execution of the unnecessary peripheral portion removal process of S163, after execution of the unnecessary peripheral portion removal process of S163, for example, the size becomes 1698 pixels×4792 pixels.

The lightness range preliminary correction process of S164 will be described.

As illustrated in FIGS. 3 and 4, as described above, the unprocessed belt image 41 output from the imaging device usually has low lightness and a narrow lightness range, and the surface details of the intermediate transfer belt are not clear. Therefore, the lightness range is corrected as a preliminary processing to facilitate the subsequent processing.

For example, the following may be performed. First, the lightness of the belt image photographed by the imaging device is extracted, and then the number of pixels is counted for each lightness to generate a histogram distribution, and the histogram distribution is further cumulated to calculate a cumulative distribution. In doing so, the frequency value or the cumulative value is divided by the total number of pixels for normalization, and the lightness at which the cumulative value becomes a specific dark side threshold value is defined as the start point of the lightness distribution of the belt image photographed by the imaging device, and the lightness at which the cumulative value becomes a specific light side threshold value is defined as the end point of the lightness distribution of the belt image photographed by the imaging device. Here, the dark side threshold value is set to, for example, 0.0025, and the light side threshold value is set to, for example, 0.9975. Accordingly, the lightness at which the cumulative value of the lightness of the belt image photographed by the imaging device becomes the dark side threshold value, for example, the lightness near 0.1 in FIG. 4, is determined as the lightness at the start point of the lightness distribution, and the lightness at which the cumulative value of the lightness of the belt image photographed by the imaging device becomes the light side threshold value, for example, the lightness near 0.22 in FIG. 4, is determined as the lightness at the end point of the lightness distribution.

Alternatively, a range that sufficiently covers the entire distribution is simply set from the histogram distribution of the lightness of the belt image photographed by the imaging device, and for example, in FIG. 4, the lightness on the light side, that is, the lightness at the start point may be set to 0.0, and the lightness on the dark side, that is, the lightness at the end point may be set to 0.3.

Subsequently, the lightness range after the lightness correction is set. For example, a conversion is performed by the following formula.

$$\text{after}[i] = \{(\text{after}[\max] - \text{after}[\min])\} * \{(\text{before}[i] - \text{before}[\min])/(\text{before}[\max] - \text{before}[\min])\} + \text{after}[\min] + \text{offset1}$$

before[min]: lightness corresponding to the dark side threshold value of the unprocessed belt image output from the imaging device before[max]: lightness corresponding to the light side threshold value of the unprocessed belt image output from the imaging device after[min]: lightness corresponding to the start point of the dark side distribution of the belt image after the lightness range preliminary correction process after[max]: lightness corresponding to the end point of the light side distribution of the belt image after the lightness range preliminary correction process offset1: offset lightness For example, 0.3 may be set to after[min] which is the start point of the lightness range after the lightness correction, and 0.9 may be set to after[max] which is the end point of the lightness range after the lightness correction. Moreover, since the distribution is dark as a whole, offset1 may be applied as an offset lightness to shift the entire lightness distribution in order to improve visibility.

Although the value range of after[i] is basically assumed to be 0.0 to 1.0, the lightness below the dark side threshold value and the lightness above the light side threshold value may be below 0.0 or may be above 1.0 after the lightness conversion, and thus the lightness is clipped so as to be 0.0 or 1.0. That is, the lightness below 0.0 is replaced with 0.0, and the lightness above 1.0 is replaced with 1.0.

As described above, the lightness range corresponding to the start point and the end point of the lightness distribution of an input image is linearly converted to generate an output image in a specific lightness range.

Furthermore, after[i] may be converted, for example, as in the following formula in order to improve visibility.

$$f[i] = \alpha * C[\text{after}[i]]^\gamma + \text{offset2}$$

α: gain
γ: gamma correction index
C: contrast correction function
offset2: offset lightness That is, a gain may be applied, a contrast function may be multiplied to form an approximately S shape, a gamma index may be multiplied, or an offset may be applied.

The value range of f[i] is basically assumed to be 0.0 to 1.0, as is the case with the value range of after[i]. Therefore, a pixel having a lightness below 0.0 is clipped to have a lightness of 0.0, and a pixel having a lightness above 1.0 is clipped to have a lightness of 1.0.

Figure 9:
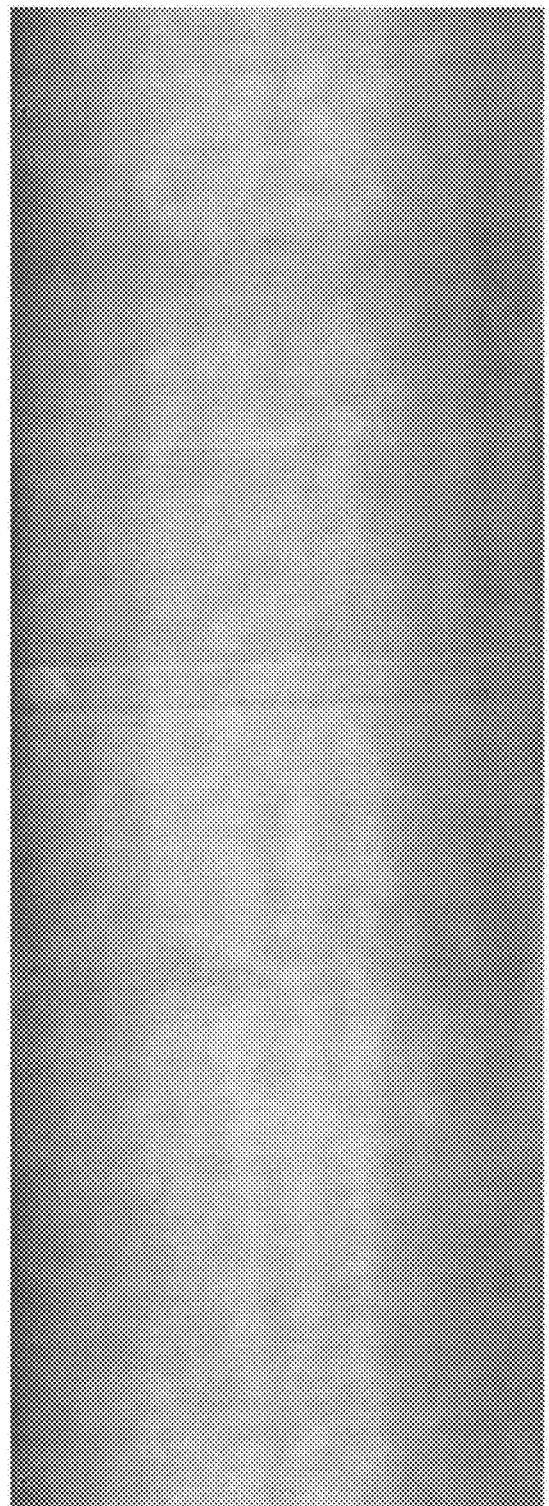
FIG. 9 is a diagram illustrating an example of a belt image obtained by correcting the belt image illustrated in FIG. 3 in a lightness range preliminary correction process.
Figure 10:
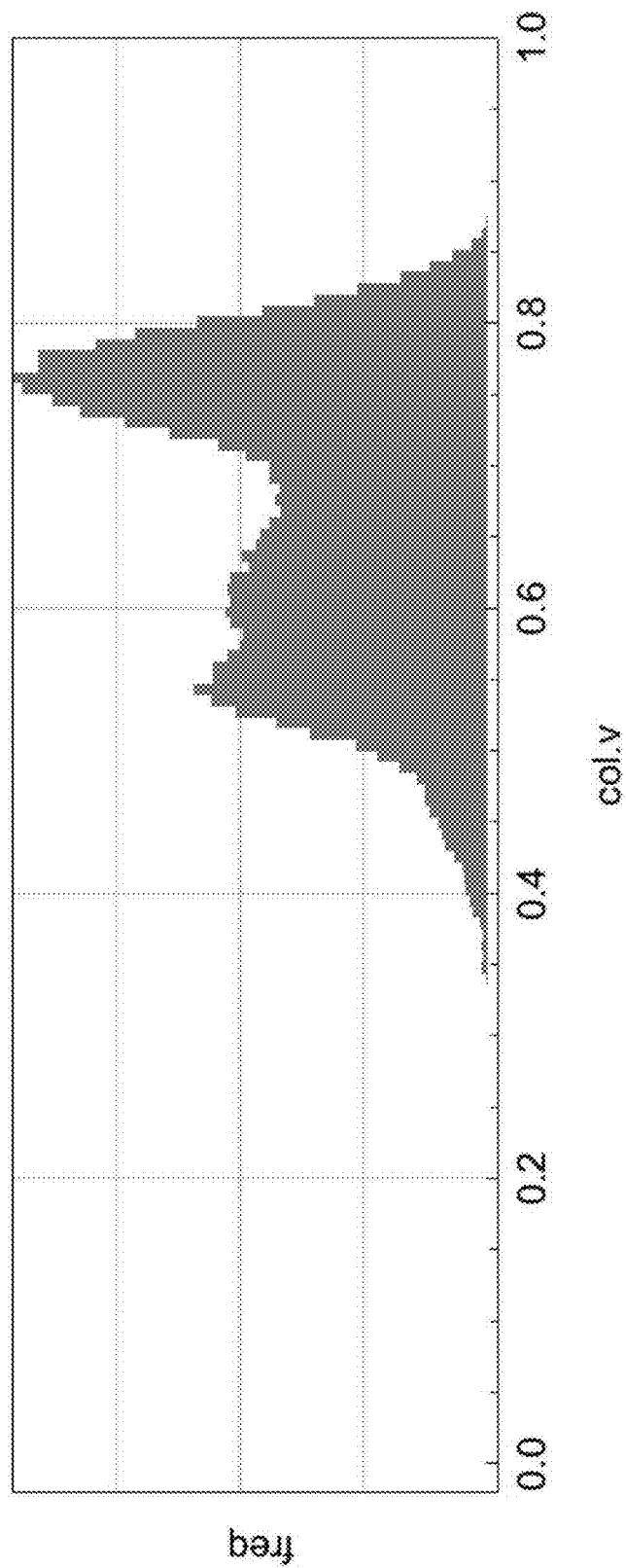
FIG. 10 is a graph illustrating a histogram distribution of the lightness of the belt image illustrated in FIG. 9.

FIG. 9 is a diagram illustrating an example of a belt image 42 obtained by processing the belt image 41 illustrated in FIG. 3 in the basic surface treatment process of S141. FIG. 10 is a graph illustrating a histogram distribution of the lightness of the belt image 42.

As illustrated in FIG. 10, the belt image 42 illustrated in FIG. 9 is converted by applying after[min]: 0.3 and after[max]: 0.9.

As illustrated in FIG. 9, in the belt image 42, the details of the surface condition of the intermediate transfer belt are emphasized to some extent by the basic surface treatment process of S141 and various things can be observed. However, due to disturbances (noise caused by photographing) such as a noise of a size smaller than a belt defect such as a dark current noise and a photon noise (hereinafter referred to as a "minute noise"), a steady noise generated by a peripheral light falloff component of the lens of the imaging device, the shadow of an operator, and an unsteady noise caused by illuminance unevenness of illumination (hereinafter referred to as "lightness unevenness"), the belt defect of a detection target is still difficult to observe.

Therefore, as illustrated in FIG. 7, after the basic surface treatment process of S141, the imaging system lightness fault removal process of S142 is executed.

Figure 11:
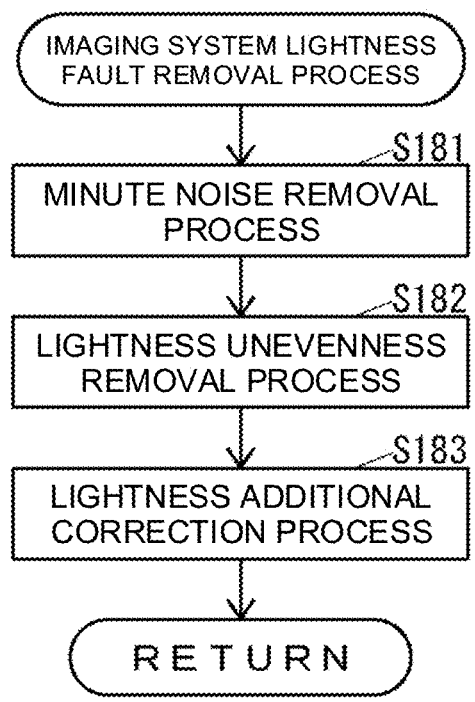
FIG. 11 is a flowchart of an imaging system lightness fault removal process illustrated in FIG. 7.

FIG. 11 is a flowchart of the imaging system lightness fault removal process illustrated in FIG. 7.

As illustrated in FIG. 11, the imaging system lightness fault removal process of S142 (see FIG. 7) includes a minute noise removal process (S181) for removing a component of minute noise from the belt image, a lightness unevenness removal process (S182) for removing lightness unevenness from the belt image, and a lightness range additional correction process (S183) for further correcting the lightness range in order to make it easy for a human to observe the surface condition of the intermediate transfer belt and to make it easy for the belt inspection system 30 to detect minute changes.

In the belt image in which the details of the surface of the intermediate transfer belt are emphasized, in addition to that steady light falloff occurs in the periphery of the image due to such as the vignetting of the optical system of the imaging device, irregular lightness unevenness that is not related to the surface condition of the intermediate transfer belt and generated due to "waviness", "skew", and "wrinkles" of the intermediate transfer belt or mixing of the shadow of the operator is observed.

Peripheral light falloff of the optical system of the imaging device extends over the entire width of the intermediate transfer belt. The lightness unevenness that is not related to the surface condition of the intermediate transfer belt and generated due to "waviness", "skew", and "wrinkles" of the intermediate transfer belt or mixing of the shadow of the operator is larger than the standard size of the belt defect, that is, the average size, and there is a size difference of several times to several tens of times.

Minute noise such as a dark current noise has a size that is a fraction of the standard size of the belt defect that is the average size, and there is also a size difference of several times.

Figure 12:
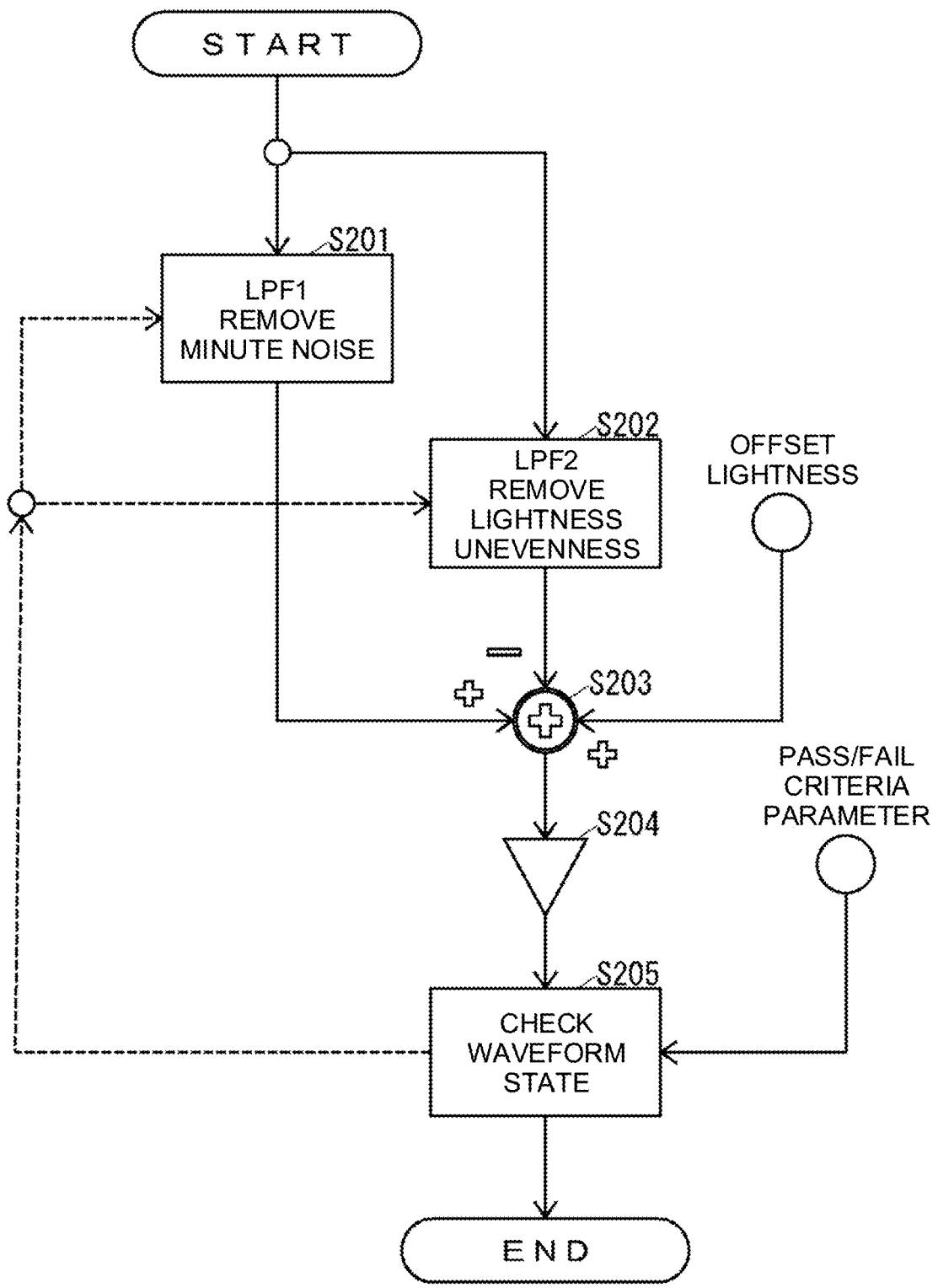
FIG. 12 is a diagram illustrating an example of the imaging system lightness fault removal process illustrated in FIG. 11.

FIG. 12 is a diagram illustrating an example of the imaging system lightness fault removal process illustrated in FIG. 11.

As illustrated in FIG. 12, first, an image from which minute noise is removed is obtained from the belt image whose lightness range is preliminarily corrected by the lightness range preliminary correction process of S164 (see FIG. 8) (S201). For example, the image may be smoothed by blurring with a Gaussian filter or the like, and a standard size of the belt defect, that is, a size of a fraction of the average size of the belt defect is applied into a Gaussian kernel and the image is blurred. For example, if the radius of the belt defect is about 10 pixels, a filter image may be obtained by convolving with a Gaussian kernel having a radius of about 5 pixels. The processing of S201 corresponds to the processing of S181.

If the intermediate transfer belt can be scanned a plurality of times or can be exposed for a long time, minute noise may be removed by averaging by multiple or long-time exposure.

In addition, for the belt image whose lightness range is preliminarily corrected by the lightness range preliminary correction process of S164, the standard size of the belt defect, that is, the size several times the average size is applied to the Gaussian kernel and the image is blurred, and an image in which light and dark variations that are several times smaller than lightness unevenness such as the light and dark variations of the size of the belt defect are uniformed is obtained (S202). For example, if the radius of the belt defect is about 10 pixels, a filter image may be obtained by convolving with a Gaussian kernel having a radius of about 25 pixels.

Subsequently, the image obtained in S202 is subtracted from the image obtained in S201, and an offset lightness is applied to adjust the lightness of the image (S203). If necessary, the lightness of the image is adjusted by further applying a gain, a contrast, or an offset again in order to improve the visibility (S204). Of the processing of S203 and the processing of S204, the processing for subtracting the image obtained in S202 from the image obtained in S201 corresponds to the processing of S182. In addition, among the processing of S204, the processing for applying the offset lightness and the processing of S204 correspond to the processing of S183.

The image in which the light and dark variations of the size of the belt defect are uniformed in S202 is subtracted from the image in which the minute noise is removed in S201, and the offset lightness is superimposed on the image (S203). Consequently, the lightness unevenness such as the peripheral light falloff of the imaging device is removed, and thus the surface condition of the intermediate transfer belt per se becomes more apparent, and the belt defect becomes also clearly visible.

After the processing of S204, the state of the signal waveform output by the processing of S204 is checked (S205). The pass/fail criteria and parameters of the check used in the processing of S205 are set in advance. As a result of the processing in S205, when it is confirmed that the uniformity of the lightness of the background image in the belt portion is below a certain degree in the belt image, the size of the Gaussian kernel in S201 and the size of the Gaussian kernel in S202 are changed in accordance with the processing result of S205, and then the imaging system lightness fault removal process illustrated in FIG. 12 is performed again. On the other hand, as a result of the processing in S205, when it is confirmed that the uniformity of the lightness of the background image in the belt portion is a certain degree or more in the belt image, the imaging system lightness fault removal process illustrated in FIG. 12 ends.

Figure 13:
FIG. 13 is a diagram illustrating an example of a belt image obtained by processing the belt image illustrated in FIG. 9 in the imaging system lightness fault removal process.
Figure 14:
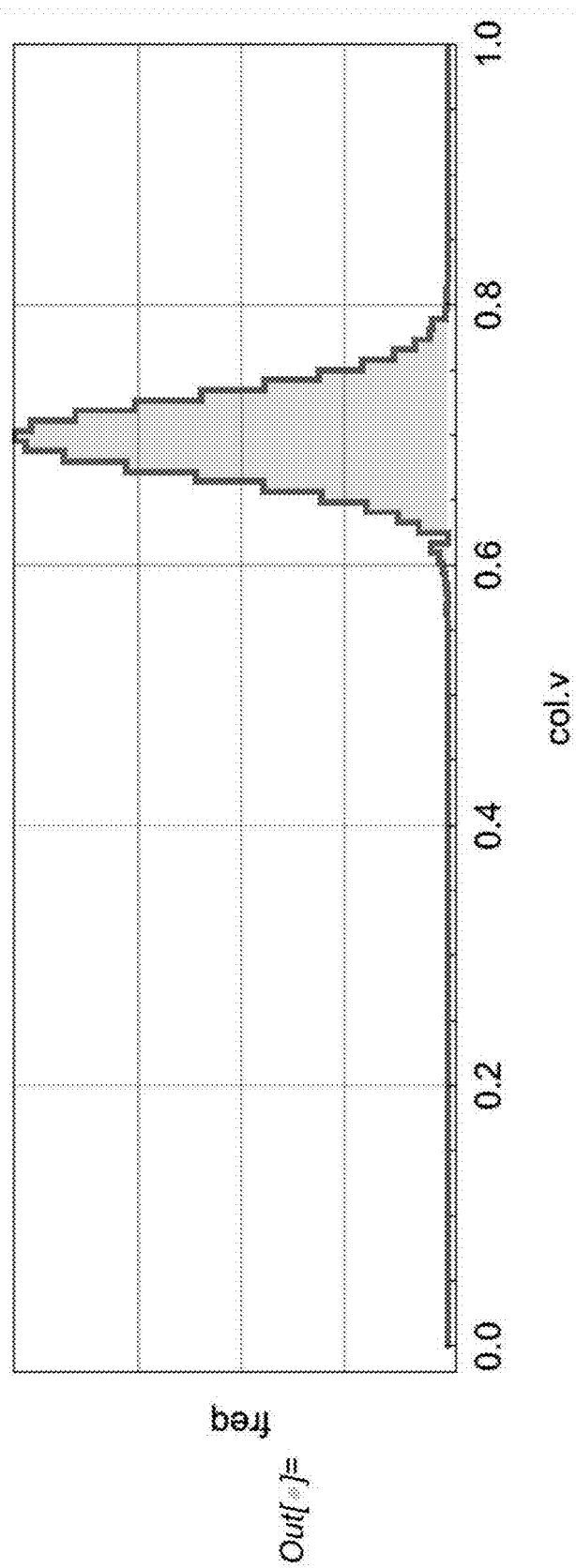
FIG. 14 is a graph illustrating a histogram distribution of the lightness of the belt image illustrated in FIG. 13.

FIG. 13 is a diagram illustrating an example of a belt image 43 obtained by processing the belt image 42 illustrated in FIG. 9 in the imaging system lightness fault removal process of S142. FIG. 14 is a graph illustrating a histogram distribution of the lightness of the belt image 43.

As a result of adjusting the lightness in order to improve the visibility of the belt image 43 illustrated in FIG. 13, the histogram distribution illustrated in FIG. 14 is a histogram distribution having a peak near the lightness of 0.7. As illustrated in FIGS. 13 and 14, it can be seen that the belt image 43 obtained by processing in the imaging system lightness fault removal process of S142 has no elements of minute noise or lightness unevenness. In the belt image 43 obtained by processing in the imaging system lightness fault removal process of S142, a trace other than the belt defect which has been scheduled to be detected, for example, a trace in manufacturing such as a molding line for molding the intermediate transfer belt, emerges, and it also becomes easy to find a lump of paint or the like that is hard to find because it is sprayed from a spray on the surface of the intermediate transfer belt when the surface of the intermediate transfer belt is processed and turned into black dots.

Figure 15A:
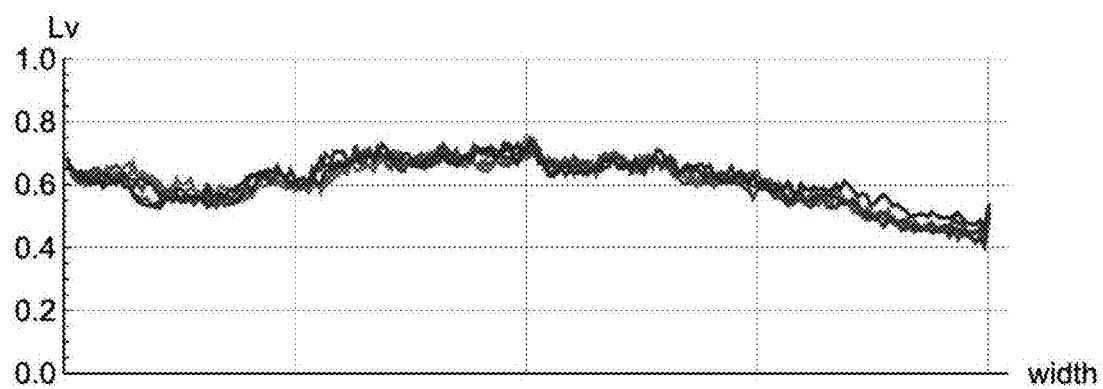
FIG. 15A is a graph in which signal levels of several lines in the belt image illustrated in FIG. 9 are plotted.
Figure 15B:
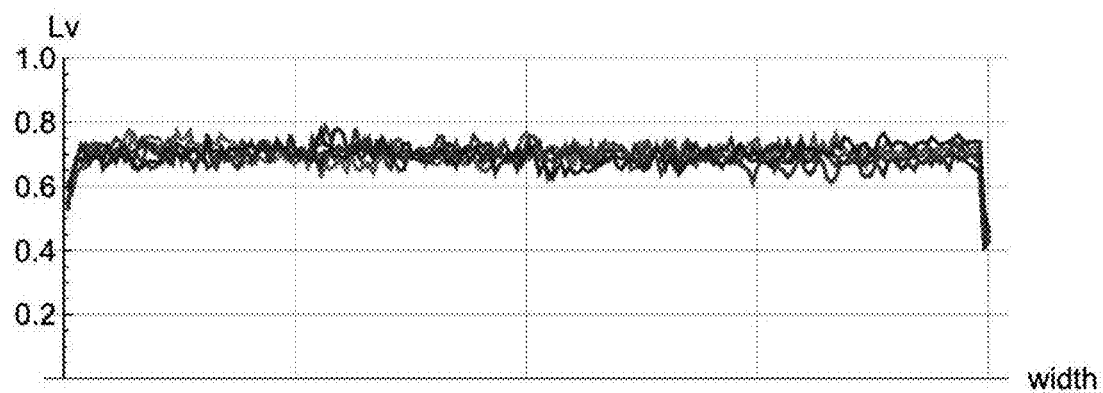
FIG. 15B is a graph in which signal levels of several lines in the belt image illustrated in FIG. 13 are plotted.

FIG. 15A is a diagram in which signal levels of several lines in the belt image 42 illustrated in FIG. 9 are plotted. FIG. 15B is a diagram in which signal levels of several lines in the belt image 43 illustrated in FIG. 13 are plotted.

In FIGS. 15A and 15B, the same type of line represents the signal level of a line at the same position. Here, the line is a row of pixels extending in a direction indicated by an arrow L (see FIG. 9 or 13) in the belt image, that is, a direction substantially the same as the width direction of the intermediate transfer belt.

As illustrated in FIG. 15A, in the belt image 42 obtained by processing in the basic surface treatment process of S141, the lightness is higher near the center than at both ends. However, in the belt image 43 obtained by processing in the imaging system lightness fault removal process of S142, it can be seen that the lightness unevenness is removed and the lightness is substantially constant over the entire width of the intermediate transfer belt, as illustrated in FIG. 15B.

Figure 16A:
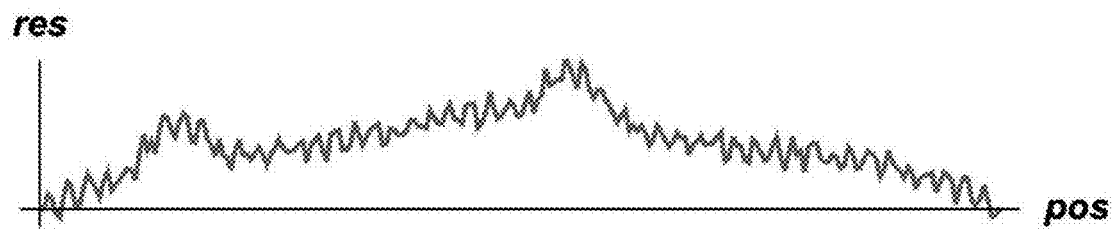
FIG. 16A is a schematic diagram illustrating an example of a lightness signal of a belt image of an intermediate transfer belt having a belt defect.
Figure 16B:
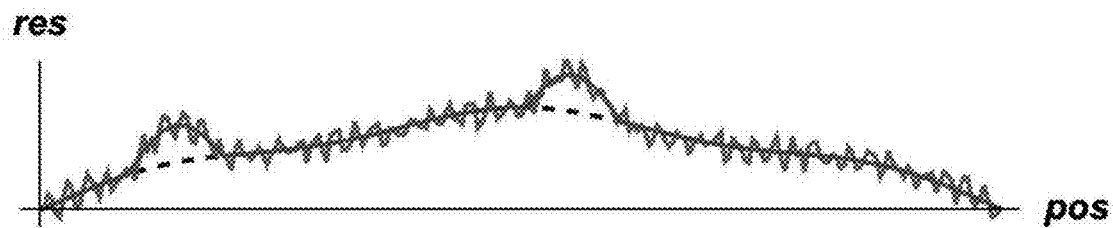
FIG. 16B is a schematic diagram illustrating the lightness signal illustrated in FIG. 16A in a state where signal components are decomposed.
Figure 16C:
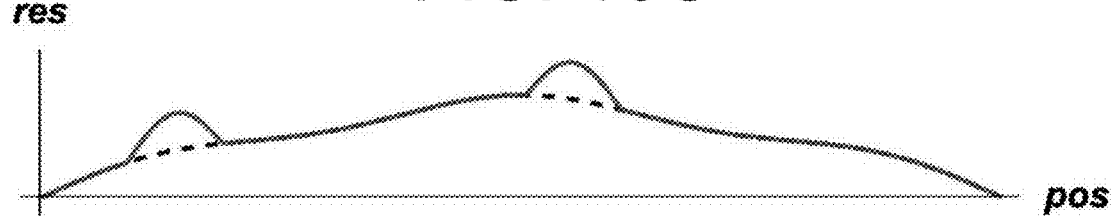
FIG. 16C is a schematic diagram illustrating a lightness signal obtained by removing a signal component of minute noise from the lightness signal illustrated in FIG. 16A.
Figure 16D:
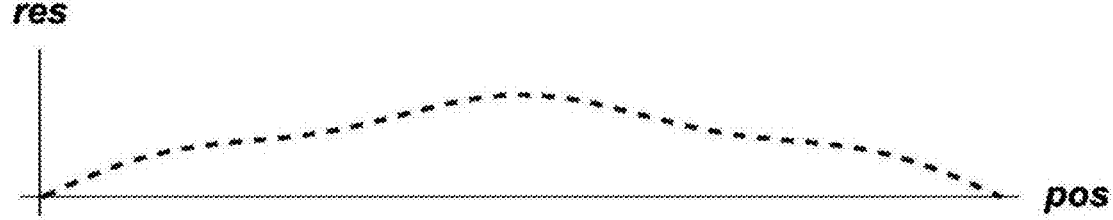
FIG. 16D is a schematic diagram illustrating a signal component of lightness unevenness among the signal components illustrated in FIG. 16B.
Figure 17A:
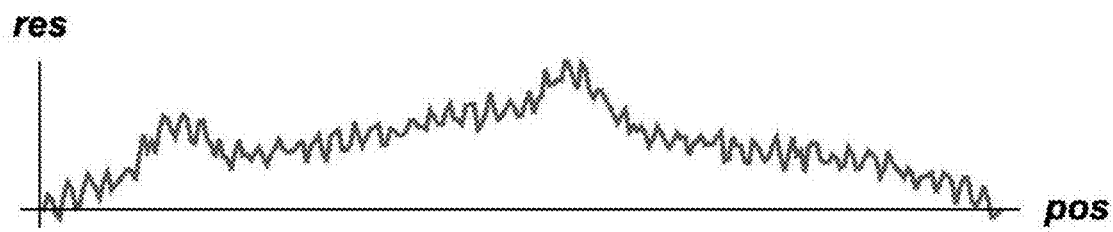
FIG. 17A is a schematic diagram illustrating a lightness signal obtained by subtracting the lightness signal illustrated in FIG. 16D from the lightness signal illustrated in FIG. 16C.
Figure 17B:
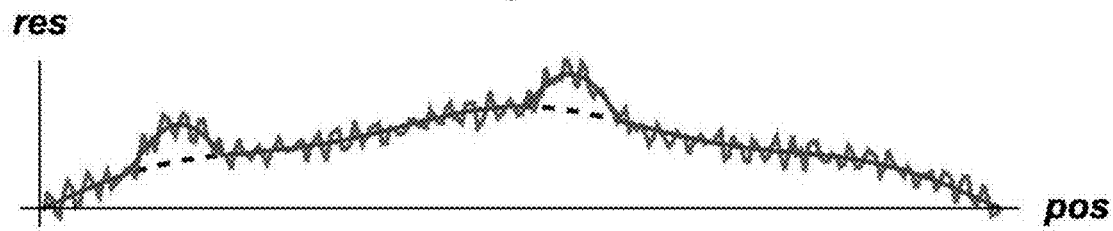
FIG. 17B is a schematic diagram illustrating a lightness signal in a state where offset lightness is applied to the lightness signal illustrated in FIG. 17A.
Figure 17C:
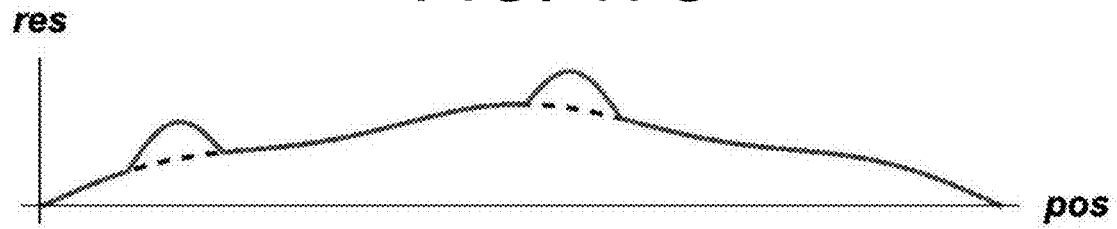
FIG. 17C is a schematic diagram illustrating an actual state of a lightness signal obtained by subtracting a signal component of lightness unevenness from a lightness signal obtained by removing a signal component of minute noise from a lightness signal of a belt image of an intermediate transfer belt having a belt defect.
Figure 17D:
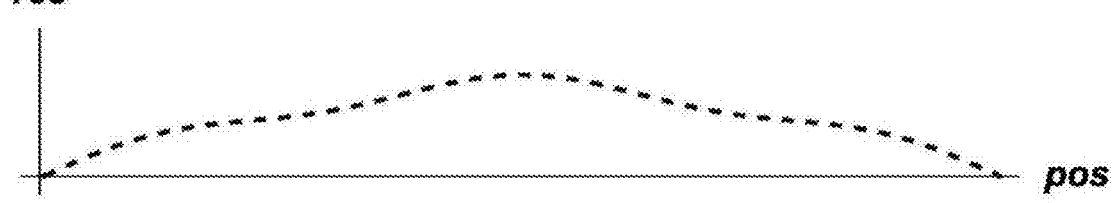
FIG. 17D is a schematic diagram illustrating a lightness signal in a state where offset lightness is applied to the lightness signal illustrated in FIG. 17C.

FIG. 16A is a schematic diagram illustrating an example of a lightness signal of a belt image of an intermediate transfer belt having a belt defect. FIG. 16B is a schematic diagram illustrating the lightness signal illustrated in FIG. 16A in a state where signal components are decomposed. FIG. 16C is a schematic diagram illustrating a lightness signal obtained by removing a signal component of minute noise from the lightness signal illustrated in FIG. 16A. FIG. 16D is a schematic diagram illustrating a signal component of lightness unevenness among the signal components illustrated in FIG. 16B. FIG. 17A is a schematic diagram illustrating a lightness signal obtained by subtracting the lightness signal illustrated in FIG. 16D from the lightness signal illustrated in FIG. 16C. FIG. 17B is a schematic diagram illustrating a lightness signal in a state where offset lightness is applied to the lightness signal illustrated in FIG. 17A. FIG. 17C is a schematic diagram illustrating an actual state of a lightness signal obtained by subtracting a signal component of lightness unevenness from a lightness signal obtained by removing a signal component of minute noise from a lightness signal of a belt image of an intermediate transfer belt having a belt defect. FIG. 17D is a schematic diagram illustrating a lightness signal in a state where offset lightness is applied to the lightness signal illustrated in FIG. 17C.

In the lightness signal illustrated in FIG. 16A, a signal component of minute noise and a signal component of lightness unevenness are mixed. In the lightness signal illustrated in FIG. 16A, signal components can be decomposed as illustrated in FIG. 16B.

By the processing of S201, the signal component of the minute noise is removed from the lightness signal illustrated in FIG. 16A, and then the lightness signal illustrated in FIG. 16C is obtained.

By the processing of S202, the lightness variation of the minute noise and the lightness variation of the belt defect size are uniformed with respect to the lightness signal illustrated in FIG. 16A, and the lightness variation of a size larger than the belt defect is extracted, and then the lightness signal illustrated in FIG. 16D is obtained. That is, among the signal components illustrated in FIG. 16B, the low frequency component of the lightness change, that is, the signal component of the lightness unevenness becomes as illustrated in FIG. 16D.

By the processing of S203, the lightness signal illustrated in FIG. 16D is subtracted from the lightness signal illustrated in FIG. 16C, and then the lightness signal illustrated in FIG. 17A is obtained. An offset lightness is applied to adjust the lightness of the image with respect to the lightness signal illustrated in FIG. 17A, and then the lightness signal illustrated in FIG. 17B is obtained. The belt image represented by the lightness signal illustrated in FIG. 17A is almost completely dark, and it is difficult to find the location of the belt defect. Thus, as illustrated in FIG. 17B, the offset lightness is applied to increase the lightness of the entire belt image, and it is thereby possible to easily find a belt defect in the belt image.

The lightness signal illustrated in FIG. 17A is an ideal signal. In reality, as illustrated in FIG. 17C, some localized lightness unevenness remains without being corrected. Therefore, if the offset lightness is applied to the lightness signal illustrated in FIG. 17C to adjust the lightness of the belt image, the lightness signal illustrated in FIG. 17D is obtained.

Figure 18:
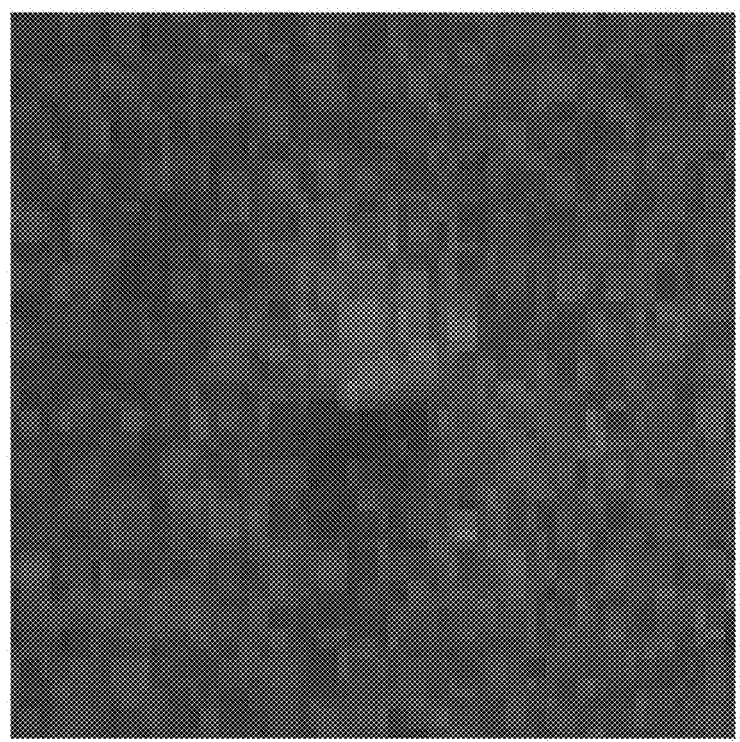
FIG. 18 is a diagram illustrating an example of an image of a belt defect portion in a belt image obtained by processing in the basic surface treatment process illustrated in FIG. 7.

FIG. 18 is a diagram illustrating an example of an image of a belt defect portion in the belt image 42 obtained by processing in the basic surface treatment process of S141.

As illustrated in FIG. 18, the image of the belt defect portion in the belt image 42 obtained by the processing in the basic surface treatment process of S141 is rough due to the effect of minute noise.

Figure 19:
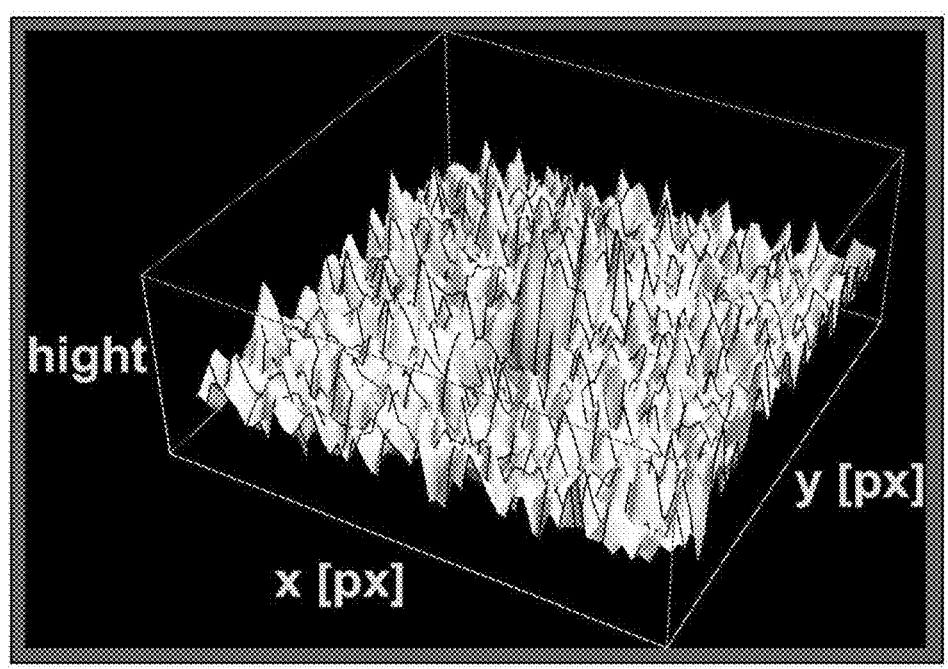
FIG. 19 is a diagram illustrating the lightness of the image illustrated in FIG. 18 plotted in a three-dimensional graph.

FIG. 19 is a diagram illustrating the lightness of the image illustrated in FIG. 18 plotted in a three-dimensional graph.

As illustrated in FIG. 19, if minute noise is left, the image will be in a needle-like state. The level of the minute noise is larger than the change in the lightness due to the belt defect per se, and since the coordinates position and height of the minute noise are random, it is inconvenient to detect a belt defect by template matching or to detect a belt defect by machine learning in a state where the minute noise remains. Therefore, the minute noise is removed by the aforementioned method or the like.

Figure 20:
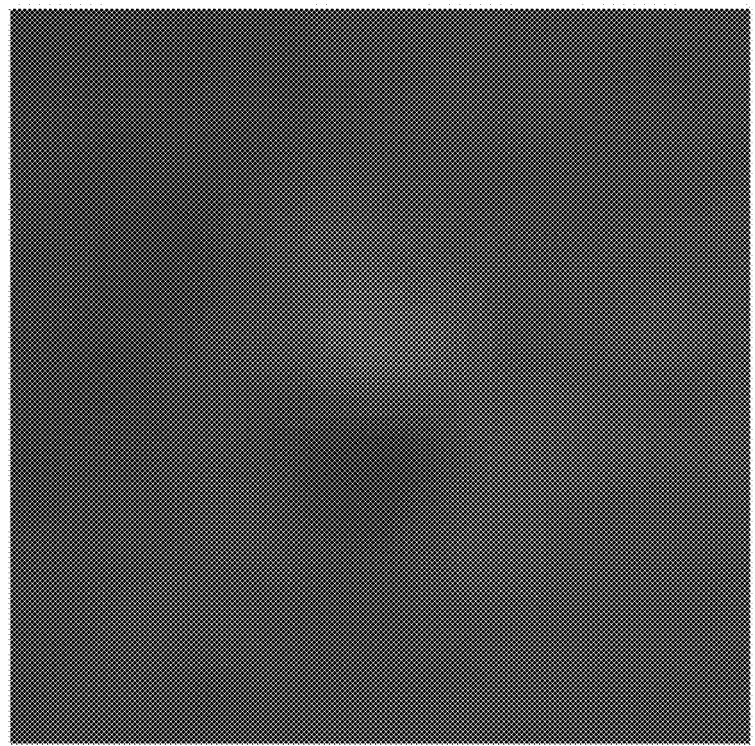
FIG. 20 is a diagram illustrating an example of an image of the belt defect portion after removing a signal component of minute noise from the image illustrated in FIG. 18.

FIG. 20 is a diagram illustrating an example of an image of the belt defect portion after removing a signal component of minute noise from the image illustrated in FIG. 18.

As illustrated in FIG. 20, the image of the belt defect portion after removing the signal component of the minute noise from the image illustrated in FIG. 18 is smooth with the minute noise removed.

Figure 21:
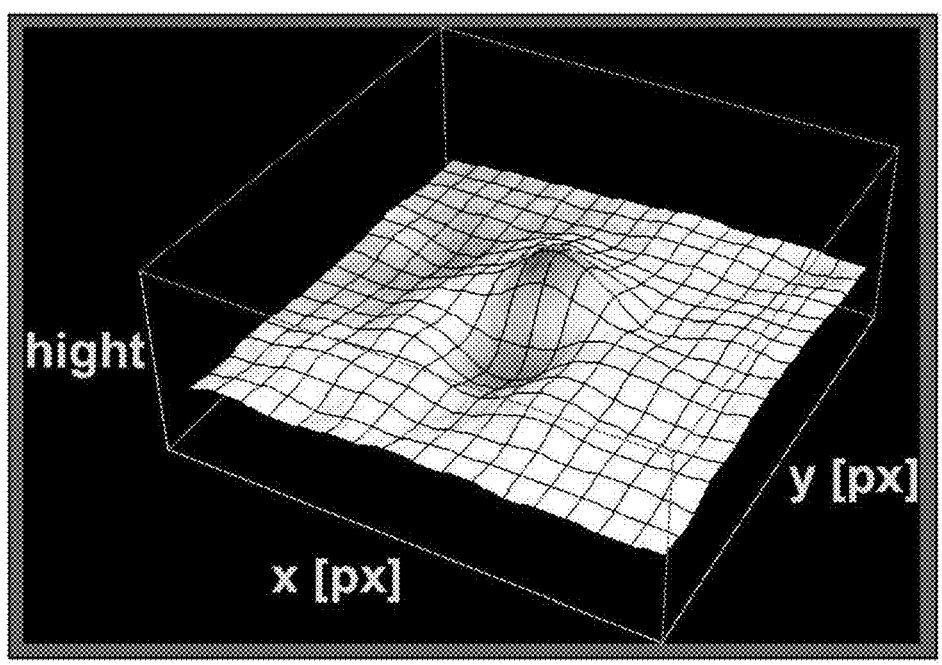
FIG. 21 is a diagram illustrating the lightness of the image illustrated in FIG. 20 plotted in a three-dimensional graph.

FIG. 21 is a diagram illustrating the lightness of the image illustrated in FIG. 20 plotted in a three-dimensional graph.

As illustrated in FIG. 21, minute noise is removed, and a change in lightness according to the shape of the belt defect per se appears. However, as illustrated in FIG. 21, the lightness variation of the belt defect still lies on the lightness variation of a size larger than the belt defect. Therefore, when the belt defect is extracted from the lightness variation illustrated in FIG. 21, the belt defect may be erroneously recognized. Therefore, as described above, the processing of S202 and the processing of S203 also remove the light and dark variations of a size larger than the belt defect.

Figure 22:
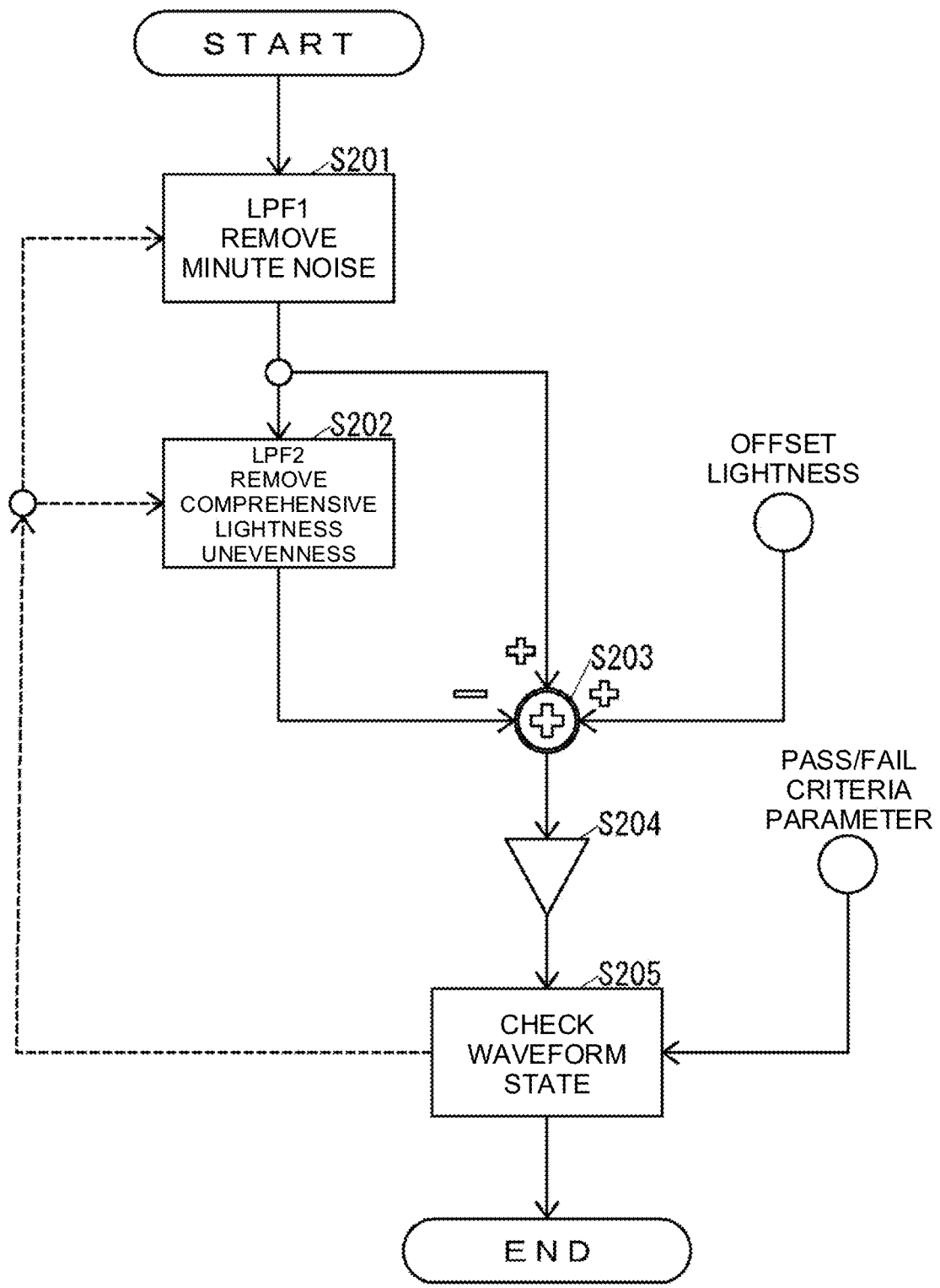
FIG. 22 is a diagram illustrating an example of the imaging system lightness fault removal process illustrated in FIG. 11, which is different from the example illustrated in FIG. 12.

In the imaging system lightness fault removal process illustrated in FIG. 12, the target of the process of S202 is a belt image whose lightness range has been preliminarily corrected by the lightness range preliminary correction process of S164. However, the imaging system lightness fault removal process illustrated in FIG. 22 may be employed as an alternative to the imaging system lightness fault removal process illustrated in FIG. 12. In the imaging system lightness fault removal process illustrated in FIG. 22, the target of the processing of S202 is the image obtained in S201.

As illustrated in FIG. 6, when the preprocessing process of S121 ends, the defect candidate detector 35a executes the defect candidate detection process of S122. That is, the defect candidate detector 35a uses the image of a typical belt defect as a template, calculates the degree of correlation of images in the belt image preprocessed in the preprocessing process of S121, and detects a belt defect candidate from the belt image.

For example, the sliding window method or the selective search method may be used. When the sliding window method is used, the sum of the differences between the pixel color values of the template image and the belt image, that correspond to each other, is calculated while sliding the template image and normalized in the output range, and the coordinates that are less than or equal to a specified threshold value are detected, and basically, the position at the coordinates becomes a belt defect candidate. The coordinates that are less than or equal to the specified threshold value are rarely a single pixel and extend to a plurality of neighboring pixels. That is, the coordinates have a certain region area. In addition, the area becomes larger in a portion having a higher correlation with the template image. In that case, the barycentric coordinates of the region may be calculated and detected as the representative coordinates of the belt defect.

If a plurality of belt defect candidates exist in the intermediate transfer belt to be inspected, there will be a plurality of regions of high correlation described above, and thus the barycentric coordinates are calculated in each region and detected as the coordinates of each belt defect.

In the defect candidate detection process of S122, the threshold value for detecting the belt defect candidate is basically set to the same value as the threshold value in the defect candidate detection process of S282 described below. However, if it is desired to avoid missing of a belt defect candidate, the threshold value may be slightly loosened to lower the probability of the missing.

The pass/fail determiner 35b executes the pass/fail determination process of S123 after the defect candidate detection process of S122 ends. That is, the pass/fail determiner 35b determines pass/fail with respect to the belt defect candidate detected in the defect candidate detection process of S122 in accordance with the learning model for pass/fail determination.

As illustrated in FIG. 6, the pass/fail determiner 35b ends the image diagnosis process by ending the pass/fail determination process of S123, and as illustrated in FIG. 1, the pass/fail determiner 35b ends the belt inspection process illustrated in FIG. 1 by ending the image diagnosis process of S102.

Next, the learning model generation process for generating the learning model used in the pass/fail determination process of S123 will be described.

Figure 23:
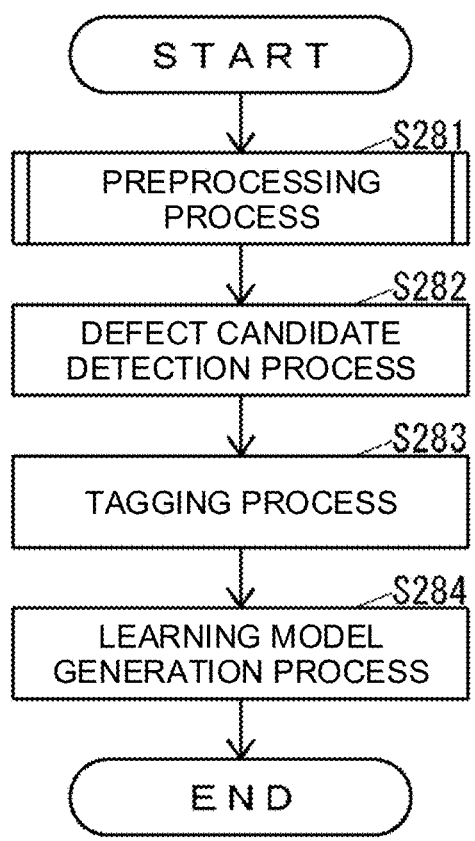
FIG. 23 is a flowchart of a learning model generation process for generating a learning model used in a pass/fail determination process illustrated in FIG. 6.

FIG. 23 is a flowchart of the learning model generation process for generating the learning model used in the pass/fail determination process of S123.

As illustrated in FIG. 23, the learning model generation process includes a preprocessing process (S281) for preprocessing a belt image for detecting a belt defect candidate, a defect candidate detection process (S282) for detecting a belt defect candidate on the basis of the belt image that has been preprocessed in the preprocessing process of S281, and a tagging process (S283) for tagging a pass/fail tag to the belt defect candidate detected by the defect candidate detection process of S282, and a learning model generation process (S284) for generating a learning model for pass/fail determination.

The preprocessing process of S281 and the defect candidate detection process of S282 illustrated in FIG. 23 are the same processes as the preprocessing process of S121 and the defect candidate detection process of S122 illustrated in FIG. 6, respectively. However, unlike the preprocessing process of S121 and the defect candidate detection process of S122, the processes of S281 and S282 are executed for a plurality of intermediate transfer belts.

In the defect candidate detection process of S282, the defect candidates are a mixture of a defect candidate that is a true defect and a defect candidate that is not a true defect even if appearing as a defect candidate. Inconvenience occurs even if the threshold value is exceeded or insufficient. That is, if the threshold value is insufficient, a true defect may be missed, and if the threshold value is exceeded, a defect candidate that is not a true defect is picked up too much, which unnecessarily slows down the processing speed. Therefore, it is important to set an appropriate threshold value, but the optimal threshold value for detecting a belt defect candidate is set to be slightly loose without intending to be extremely strict, that is, priority is given to picking up a location that seems to be a belt defect without missing it as a belt defect candidate rather than efficiently detecting them without waste, and a portion that is not a true defect is also extracted as a candidate.

At the same time, a true defect image and a non-defect image for machine learning are collected by setting the threshold value to be loose. That is, by intentionally setting the threshold value to be loose, it is possible to collect the images of both the location where there is a correlation but is not a true belt defect and the location where there is a true belt defect, with a location that seems to be a belt defect as a belt defect candidate. That is, this brings about the effect of sufficiently collecting both of the image of the location of a true positive belt defect and the image of the location of a false positive belt defect.

When the defect candidate detection process of S282 ends, the tagging process of S283 is performed. That is, a pass/fail tag is attached to each of multiple belt defect candidates detected from the plurality of intermediate transfer belts in the defect candidate detection process of S282. The tag may be attached on the basis of the result of visual inspection and palpation of the intermediate transfer belt by an inspector having a technique for the pass/fail determination of the intermediate transfer belt.

When the tagging process of S283 ends, the learning model generation process of S284 is executed. That is, the learning model generator 35c generates a learning model for pass/fail determination by machine learning the belt defect candidates that have been attached with the pass/fail tag in the tagging process of S283. By sufficiently securing both images of the true positive belt defect image and the false positive belt defect image in the defect candidate detection process of S282, a learning model capable of appropriately separating the true positive belt defect and the false positive belt defect can be generated in the learning model generation process of S284.

In the learning model generation process of S284, for example, an existing method such as LogisticRepression, RandomForest, and support Vector Machine may be used, or of course, a more advanced learning model may be used.

However, even simple machine learning is often practically sufficient, if the boundary between the true positive belt defect and the false positive belt defect is found and if it is determined whether the defect belongs to the true positive belt defect or the false positive belt defect. Rather, simple machine learning is more convenient on a production line in terms of learning time and additional learning, and it is often the case that simple learning is suitable for the production line because of easy adjustment and updating of parameters.

According to the belt inspection system and the belt inspection program according to the embodiment of the present disclosure described above, it is possible to easily identify the position of a belt defect in an actual intermediate transfer belt.

As described above, the belt inspection system 30 detects a belt defect candidate from the belt image from which a noise of a first size or smaller, which is smaller than the standard size of a belt defect such as a dark current noise and a photon noise, and a noise of a second size or larger, which is larger than the standard size of a belt defect such as lens light falloff and in-plane unevenness are removed in S201 to S203 (S122 and S282). Thus, the accuracy of detecting a belt defect candidate can be improved, and as a result, the accuracy of belt defect detection can be improved.

The belt inspection system 30 determines pass/fail of quality of the intermediate transfer belt for the belt defect candidate with improved detection accuracy in accordance with a learning model (S123). Thus, the accuracy of pass/fail determination of the quality of the intermediate transfer belt is improved.

The belt inspection system 30 generates a learning model for pass/fail determination of the quality of the intermediate transfer belt with the use of the belt defect candidate with improved detection accuracy (S284). Thus, the accuracy of pass/fail determination of the quality of the intermediate transfer belt is improved.

Next, variations of the above-described embodiment of the present disclosure will be described with further reference to FIGS. 24 to 31.

As illustrated in FIG. 13, in the belt image 43, by the imaging system lightness fault removal process of S142, for example, it becomes possible to observe a molding mark at the time of extrusion molding in the generation process of the intermediate transfer belt, a scratch mark between the intermediate transfer belt and a jig, at the time of a surface coating processing of the intermediate transfer belt, a processing mark of the intermediate transfer belt, and the like (a noise due to the generation process of the intermediate transfer belt). The molding mark, the scratch mark, the processing mark, and the like, described above, may be observed as a band-shaped noise or a streak-shaped noise extending in the width direction of the intermediate transfer belt. The band-shaped or streak-shaped noise extending in the width direction of the intermediate transfer belt is harmless to the quality of the intermediate transfer belt in many cases, but may be erroneously detected as a belt defect and may reduce the detection accuracy of a belt defect. As a result, it becomes a factor of lowering the accuracy of determining pass/fail of the intermediate transfer belt.

Figure 24:
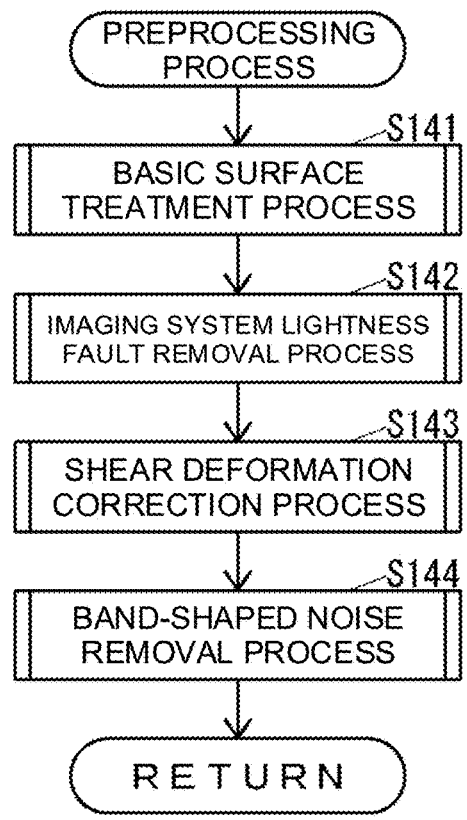
FIG. 24 is a flowchart of a preprocessing process according to a variation of the embodiment of the present disclosure.

Therefore, in the present variation, as illustrated in FIG. 24, after the imaging system lightness fault removal process of S142 in the preprocessing process, in order to remove the band-shaped or streak-shaped noise extending in the width direction of the intermediate transfer belt, the shear deformation correction process of S143 and the band-shaped noise removal process of S144 are further executed to achieve a high belt defect detection accuracy.

The basic surface treatment process S141 and the imaging system lightness fault removal process S142 of the present variation illustrated in FIG. 24 and the configuration of the belt inspection system 30 that executes these processes are the same as those in the above-described embodiment of the present disclosure. Thus, in the following description, reference will be made with the use of the same reference numerals as those in the above-described embodiment of the present disclosure, and repeated description thereof will be omitted. The shear deformation correction process of S143 and the band-shaped noise removal process of S144 according to the present variation are also implemented by the CPU of the controller 35 of the belt inspection system 30 executing the program stored in the storage 34 or the ROM of the controller 35.

In the installation of the imaging device in the photographing process of S101, when the imaging device is installed parallel to the width direction of the intermediate transfer belt, that is, in the case of a normal viewing state, a belt portion is included in the state of a rectangle in the belt image. As a result, the molding mark, the scratch mark, the processing mark, and the like extending in the width direction of the intermediate transfer belt are observed parallel to the line extending in the direction indicated by the arrow L (see FIG. 13) in the belt image. However, when the imaging device is not installed parallel to the width direction of the intermediate transfer belt in the installation of the imaging device in the photographing process of S101, the belt portion is included in the state of being sheared and deformed in the belt image, that is, in the state of a parallelogram that is not a rectangle, and as a result, the molding mark, the scratch mark, the processing mark, and the like extending in the width direction of the intermediate transfer belt are observed in an inclined manner in the belt image. Therefore, in the shear deformation correction process of S143, the belt image is corrected to an image in the original normal viewing state.

Figure 25:
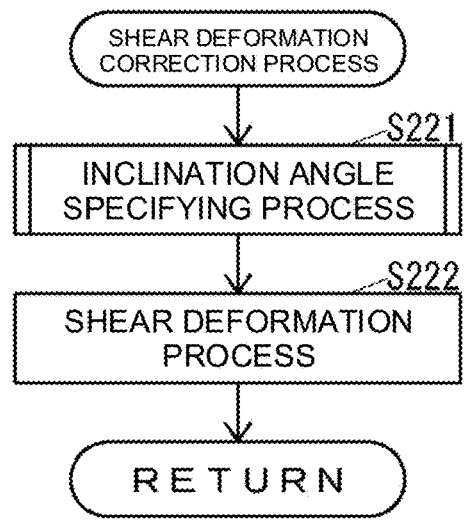
FIG. 25 is a flowchart of a shear deformation correction process illustrated in FIG. 24.

FIG. 25 is a flowchart of the shear deformation correction process illustrated in FIG. 24.

As illustrated in FIG. 25, in the shear deformation correction process of S143 (see FIG. 7) includes an inclination angle specifying process (S221) for specifying the inclination angle of the belt portion in the belt image and a shear deformation process (S222) for shearing and deforming, the belt image that has been sheared and deformed, in the opposite direction in accordance with the inclination angle specified in inclination angle specifying process of S221, and returning the belt image to a state equivalent to that when the imaging device is accurately installed and the image is viewed straight.

Figure 26:
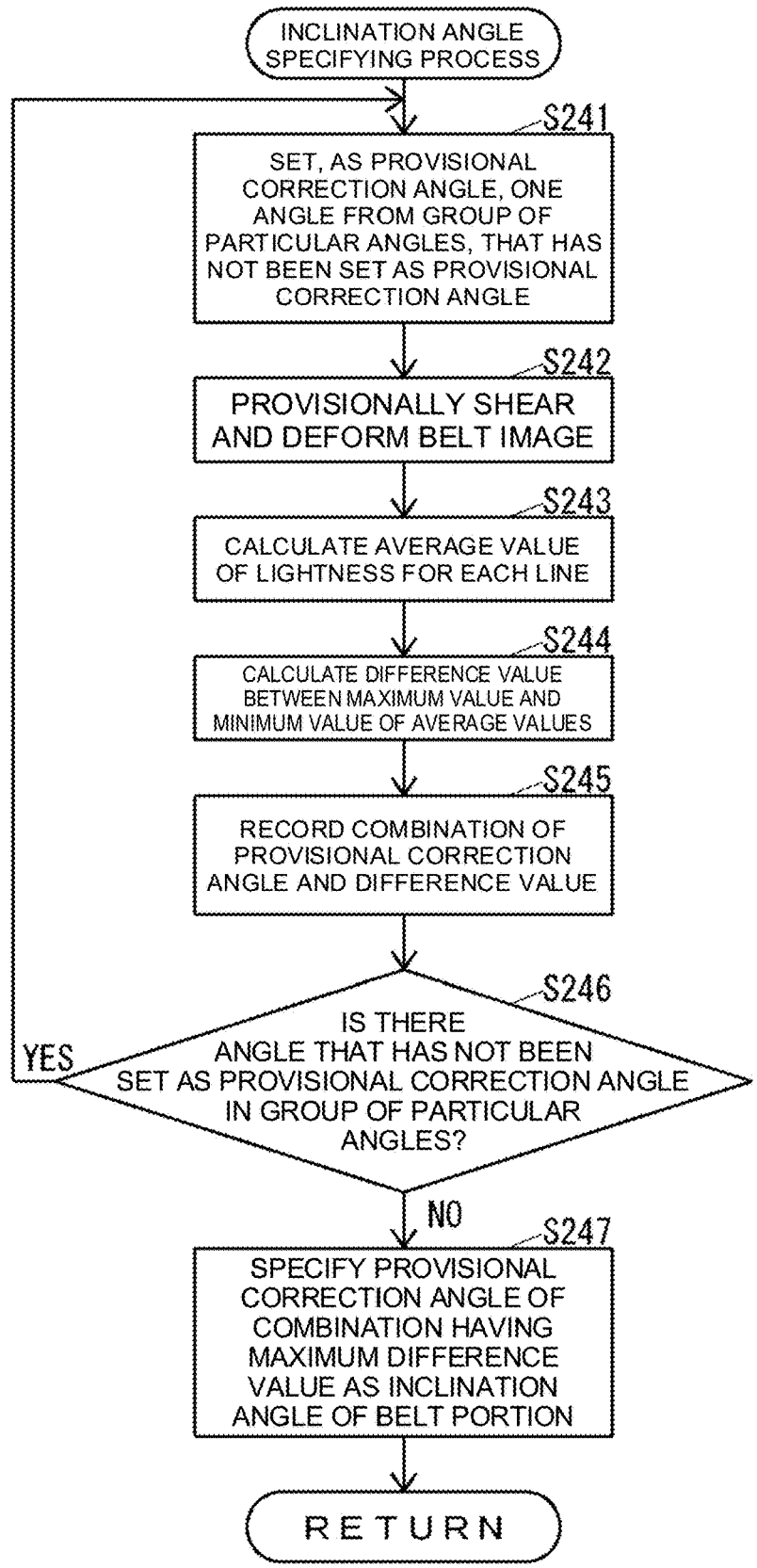
FIG. 26 is a flowchart of an inclination angle specifying process illustrated in FIG. 25.

FIG. 26 is a flowchart of the inclination angle specifying process illustrated in FIG. 25.

As illustrated in FIG. 26, the defect candidate detector 35a sets, as a provisional correction angle, one angle that has not yet been set in the inclination angle specifying process as a provisional correction angle (hereinafter referred to as a "provisional correction angle") from the group of particular angles (S241). Here, the group of particular angles is a group of angles that are apart from each other by a particular pitch among the angles in a particular angle range including an angle that is assumed to cause shear deformation, for example, a range of angles from −3° to +3°.

After the processing of S241, the defect candidate detector 35a provisionally shears and deforms the belt image at the provisional correction angle set in S241 (S242). Here, the defect candidate detector 35a may use, for example, Affine conversion as a method for shearing and deforming the belt image. As a result of the shear deformation, the portion of the belt image, that is no longer the belt portion, for example, may be filled with the average value of the lightness of the belt portion in the belt image before the shear deformation.

After the processing of S242, the defect candidate detector 35a calculates the average value of the lightness of the pixels for each line in the belt image shear-deformed in S242 (S243). Here, in the belt image shear-deformed in S242, the defect candidate detector 35a obtains, for each line, the total value of the lightness of all the pixels belonging to the line. In addition, the average value of the lightness for each line may be calculated by dividing the total value by the number of all the pixels belonging to the line, or the average value of the lightness for each line may be calculated by a method other than a simple arithmetic mean, such as calculating a geometric mean for the lightness of all the pixels belonging to the line.

After the processing of S243, the defect candidate detector 35a calculates the difference value between the maximum value and the minimum value of the average values calculated in S243 (S244).

Next, the defect candidate detector 35a records the combination of the provisional correction angle set in S241 and the difference value calculated in S244 (S245).

Next, the defect candidate detector 35a determines whether there is an angle that has not been set as the provisional correction angle in the inclination angle specifying process of this time in the group of particular angles (S246).

If determining in S246 that there is an angle that has not been set as the provisional correction angle in the inclination angle specifying process of this time in the group of particular angles, the defect candidate detector 35a executes the processing of S241.

If determining in S246 that there is no angle that has not been set as the provisional correction angle in the inclination angle specifying process of this time in the group of particular angles, the defect candidate detector 35a specifies, the provisional correction angle of the combination having the largest difference value among all the combinations recorded in S245, as the inclination angle of the belt portion in the belt image (S247).

Here, when the band-shaped or streak-shaped noise extending in the width direction of the intermediate transfer belt is parallel to the line of the belt image, there is a high possibility that the maximum value of the average value of the lightness for each line pixel will be the maximum in the belt image, and there is a high possibility that the minimum value of the average value of the lightness for each line pixel will be the minimum in the belt image. That is, when the band-shaped or streak-shaped noise extending in the width direction of the intermediate transfer belt is parallel to the line of the belt image, there is a high possibility that the difference value between the maximum value and the minimum value of the average values of the lightness for each line pixel will be the maximum in the belt image. Therefore, in S247, the provisional correction angle of a combination having the maximum difference value is specified as the inclination angle of the belt portion in the belt image.

After the processing of S247, the defect candidate detector 35a ends the inclination angle specifying process illustrated in FIG. 26.

Figure 27A:
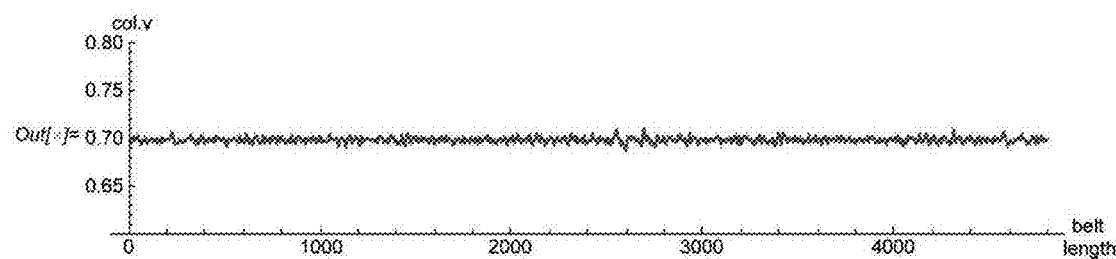
FIG. 27A is a diagram illustrating an example of an average value of lightness for each line in a belt image when a provisional correction angle is 0.00° in the inclination angle specifying process illustrated in FIG. 26.
Figure 27B:
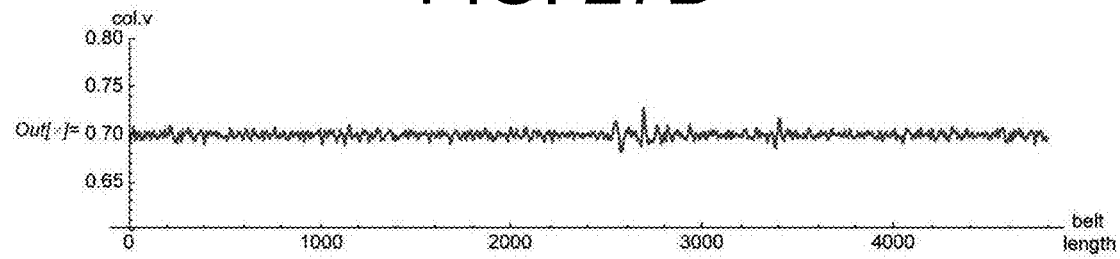
FIG. 27B is a diagram illustrating an example of an average value of lightness for each line in a belt image when a provisional correction angle is −0.85° in the inclination angle specifying process illustrated in FIG. 26.
Figure 27C:
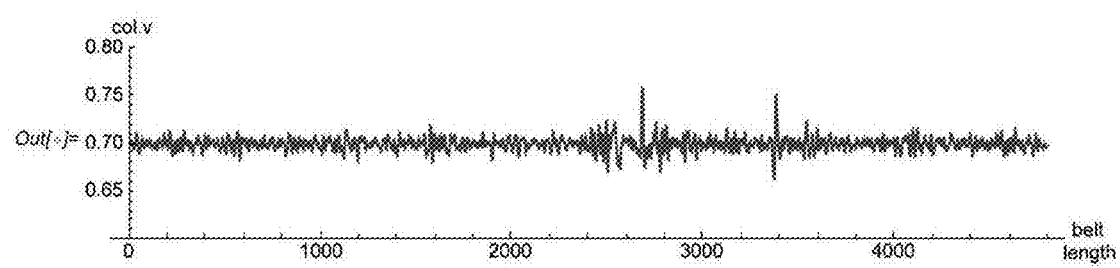
FIG. 27C is a diagram illustrating an example of an average value of lightness for each line in a belt image when a provisional correction angle is −1.70° in the inclination angle specifying process illustrated in FIG. 26.
Figure 27D:
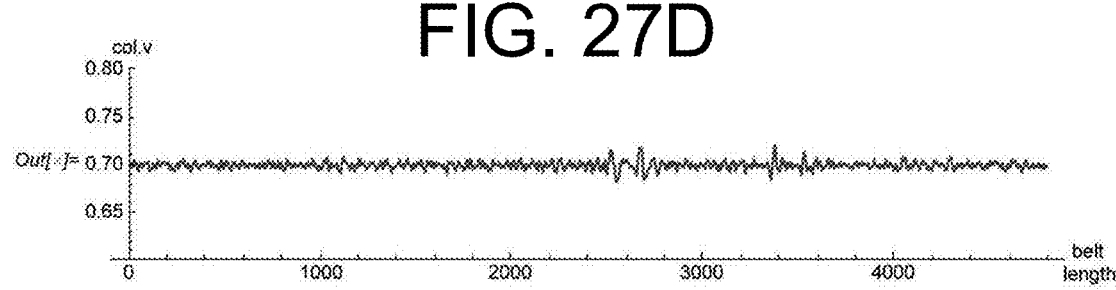
FIG. 27D is a diagram illustrating an example of an average value of lightness for each line in a belt image when a provisional correction angle is −2.55° in the inclination angle specifying process illustrated in FIG. 26.

FIG. 27A is a diagram illustrating an example of the average value of the lightness for each line in the belt image when the provisional correction angle is 0.00°. FIG. 27B is a diagram illustrating an example of the average value of the lightness for each line in the belt image when the provisional correction angle is −0.85°. FIG. 27C is a diagram illustrating an example of the average value of the lightness for each line in the belt image when the provisional correction angle is −1.70°. FIG. 27D is a diagram illustrating an example of the average value of the lightness for each line in the belt image when the provisional correction angle is −2.55°.

In the examples illustrated in FIGS. 27A to 27D, the inclination angle of the belt portion in the belt image is −1.70°.

As illustrated in FIG. 27A, when the provisional correction angle is 0.00°, that is, when the shear deformation is not substantially performed in S242, the average value of the lightness for each line in the belt image has almost no difference between the lines. As illustrated in FIG. 27B, when the provisional correction angle is −0.85°, that is, when the amount of shear deformation in S242 is insufficient, the difference value between the maximum value and the minimum value of the average values of the lightness for each line in the belt image is larger than that illustrated in FIG. 27A, but is not the maximum. As illustrated in FIG. 27C, when the provisional correction angle is −1.70°, that is, when the amount of shear deformation in S242 is optimal, the difference value between the maximum value and the minimum value of the average values of the lightness for each line in the belt image is larger than that illustrated in FIG. 27B, and is the maximum. As illustrated in FIG. 27D, when the provisional correction angle is −2.55°, that is, when the amount of shear deformation in S242 is excessive, the difference value between the maximum value and the minimum value of the average values of the lightness for each line in the belt image is larger than that illustrated in FIG. 27A, but is not the maximum.

The defect candidate detector 35a calculates the average value of the lightness of the pixels for each line in the belt image in S243 in the inclination angle specifying process illustrated in FIG. 26. However, the defect candidate detector 35a may employ the total value of the lightness of the pixels for each line in the belt image, as an alternative to the average value of the lightness of the pixels for each line in the belt image. When employing the total value of the lightness of pixels for each line in the belt image, the defect candidate detector 35a can process slightly faster because the calculation is simpler than when the average value is used.

In the inclination angle specifying process illustrated in FIG. 26, the defect candidate detector 35a calculates the difference value between the maximum value and the minimum value of the average values of the lightness of the pixels for each line in S244 and uses the difference value to search for the inclination angle at which the difference value becomes the maximum, and calculates the inclination angle at that time as an optimal angle. However, the defect candidate detector 35a may employ the variance or standard deviation of the average value of the lightness of the pixels for each line as an alternative to the difference value between the maximum value and the minimum value of the average values of the lightness of the pixels for each line. That is, while gradually changing the shear angle, the variance or standard deviation of the average value of the lightness of the pixels for each line may be obtained, and the inclination angle at which the variance or standard deviation becomes the maximum may be calculated as the optimal angle.

In the inclination angle specifying process illustrated in FIG. 26, the pitch of the angles included in the group of particular angles may be set to a range such as $\frac{1}{10}°$ that can sufficiently cover the tolerance in specifying the coordinates of the belt defect.

It is expected that the pitch of the angles included in the group of particular angles will be finer to improve the accuracy of the inclination angle specified in S247, but the calculation time is also required accordingly. Therefore, by making the pitch of the angles included in the group of particular angles slightly rough and interpolating between the grid points formed by the combination recorded in S245, the provisional correction angle of the combination in which the difference value between the maximum value and the minimum value of the average values of the lightness of the pixels for each line is the maximum may be thereby estimated.

Figure 28:
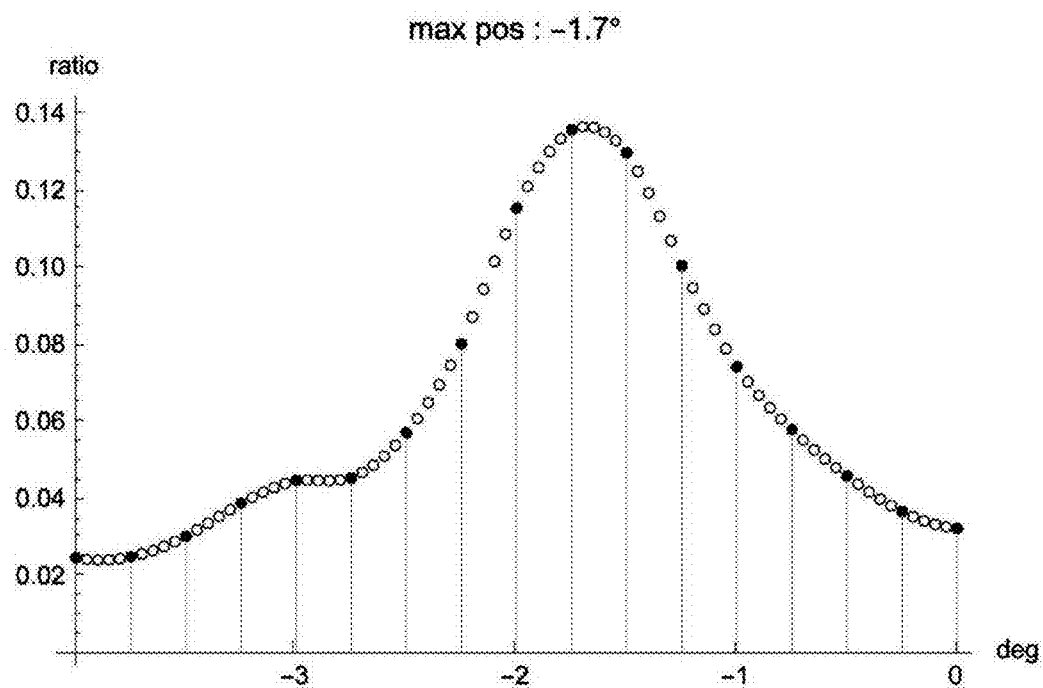
FIG. 28 is a diagram in which a difference value between a maximum value and a minimum value of the average values of the lightness of the pixels for each line in the inclination angle specifying process illustrated in FIG. 26 is plotted for each provisional correction angle.

For example, the pitch of the angles included in the group of particular angles may be set to $\frac{1}{4}°$, and the interpolation calculation may be performed at $\frac{1}{20}°$ between the grid points formed by the combination recorded in S245. FIG. 28 is a diagram in which the difference value between the maximum value and the minimum value of the average values of the lightness of the pixels for each line is plotted for each provisional correction angle. In FIG. 28, points indicated by black circles indicate grid points in which the pitch included in the group of particular angles is $\frac{1}{4}°$. In FIG. 28, points indicated by white circles indicate points obtained by performing interpolation calculation between grid points at $\frac{1}{20}°$. As illustrated in FIG. 28, the provisional correction angle of the combination in which the difference value between the maximum value and the minimum value of the average values of the lightness of the pixels for each line is the maximum is estimated to be $-1.70°$.

Since the photographing camera of an inspection device is usually fixed firmly, the inclination angle is constant regardless of the intermediate transfer belt. In that case, each image pickup system of the intermediate transfer belt has its own inclination angle. Thus, if the inclination angle specifying process is performed once for each image pickup system of the intermediate transfer belt, it is not necessary to perform it frequently, and for example, it is not necessary to perform it for each intermediate transfer belt. However, this is not the case when the inclination angle changes for each intermediate transfer belt.

In the above, a method for calculating the inclination angle of the belt portion in the belt image by a computer has been described. However, the operator may visually measure the inclination angle of the belt portion in the belt image. For example, the operator may visually measure the inclination angle of the belt portion in the belt image by overlaying a protractor-shaped inclination line on the screen of the display 32 that displays the belt image. In addition, while displaying the belt image on the screen of the display 32, the belt image is gradually sheared and deformed, and when the band-shaped or streak-shaped noise extending in the width direction of the intermediate transfer belt in the belt image becomes parallel to the edge of the screen on the display 32, the operator is caused to stop the shear deformation, and the inclination angle at that time may be thereby obtained as the inclination angle of the belt portion in the belt image.

In the way described above, when the inclination angle of the belt portion in the belt image is obtained, shear deformation is executed on the belt image in accordance with the inclination angle specified in the inclination angle specifying process by the shear deformation process of S222 (see FIG. 25).

Figure 29A:
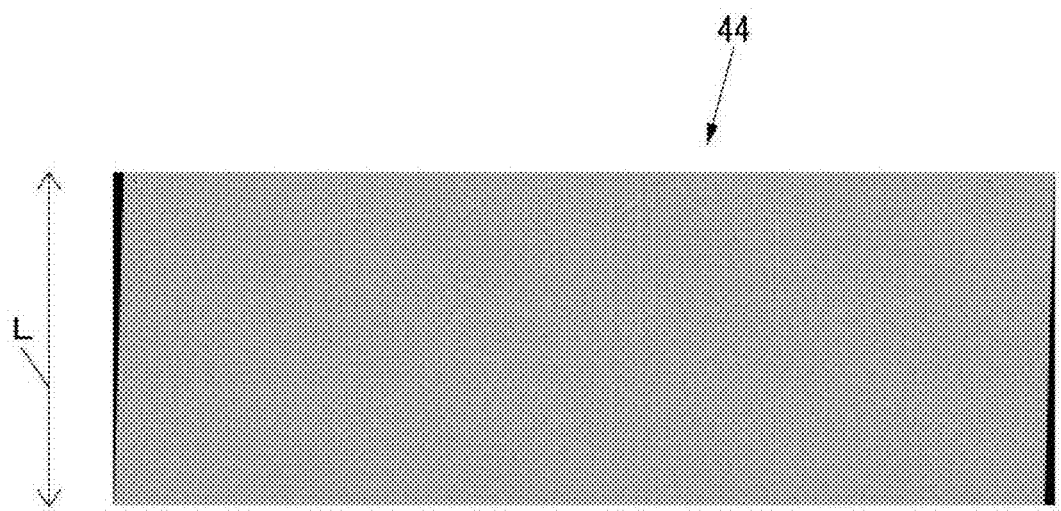
FIG. 29A is a diagram illustrating an example of a belt image obtained by processing the belt image illustrated in FIG. 13 in a shear deformation process.
Figure 29B:
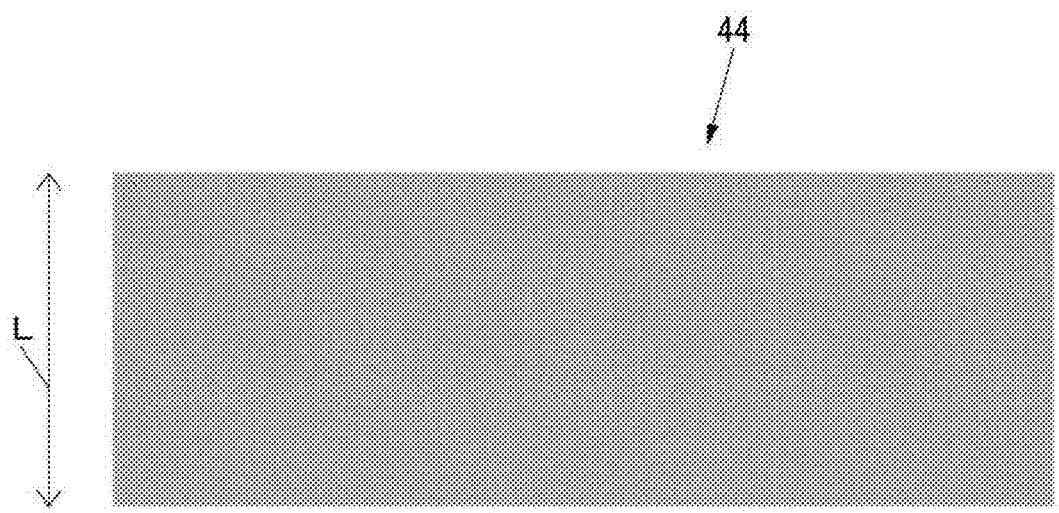
FIG. 29B is a diagram illustrating an example of a belt image obtained by processing the belt image illustrated in FIG. 13 in the shear deformation process, which is different from the example illustrated in FIG. 29A.

FIG. 29A is a diagram illustrating an example of a belt image 44 obtained by processing the belt image 43 illustrated in FIG. 13 in the shear deformation process. FIG. 29B is a diagram illustrating an example of the belt image 44 obtained by processing the belt image 43 illustrated in FIG. 13 in the shear deformation process, which is different from the example illustrated in FIG. 29A.

The belt image 44 illustrated in FIG. 29A is a belt image in which a padding processing is performed, with a black color, on the difference portion with the rectangle generated by the shear deformation. The belt image 44 illustrated in FIG. 29B is a belt image in which a padding processing is performed, with a color having the average lightness of the belt portion, on the difference portion with the rectangle generated by the shear deformation. By the shear deformation process of S222, as illustrated in FIGS. 29A and 29B, it is possible to obtain a belt image equivalent to a belt image photographed in the original state where the imaging device is accurately installed, that is, in the normal viewing state.

As illustrated in FIG. 24, if a belt image equivalent to the belt image photographed in the normal viewing state is obtained by the shear deformation correction process of S143, the band-shaped noise removal process of S144 is executed in order to remove the band-shaped or streak-shaped noise extending in the width direction of the intermediate transfer belt.

FIG. 30 is a flowchart of the band-shaped noise removal process illustrated in FIG. 24.

As illustrated in FIG. 30, the defect candidate detector 35a calculates the average value of the lightness of each line of the belt image obtained by the shear deformation correction process of S143 (S261). Here, in the belt image shear-deformed in S261, the defect candidate detector 35a calculates, for each line of the belt image obtained by the shear deformation correction process of S143, the total value of the lightness of all the pixels belonging to the line. In addition, the average value of the lightness for each line may be calculated by dividing the total value by the number of all the pixels belonging to the line, or the average value of the lightness for each line may be calculated by a method other than a simple arithmetic mean, such as calculating a geometric mean for the lightness of all the pixels belonging to the line.

The defect candidate detector 35a performs the processing of S261 and calculates the average value of the lightness of the entire belt image obtained by the shear deformation correction process of S143 (S262).

After the processing of S261, the defect candidate detector 35a subtracts, from the lightness of each pixel in a line, the average value of the lightness calculated in S261 for the line, for all the lines of the belt image obtained by the shear deformation correction process of S143 (S263). In the belt image, the gap between the lines is reduced by the processing of S263, and, for example, the band-shaped noise or streak-shaped noise that extends over the entire width of the intermediate transfer belt is eliminated or suppressed.

After the processing of S262 and the processing S263, the defect candidate detector 35a adds the average value of the lightness calculated in S262 for the belt image, to the lightness of each pixel of each line of the belt image obtained in S263 (S264). In the belt image, a reference lightness, that is, the average value of the lightness calculated in S262, is applied to each pixel by the processing of S264. The defect candidate detector 35a may slightly increase or decrease the lightness of the belt image, may apply a specified lightness offset, or may perform a contrast operation or a gamma characteristic operation on the belt image in order to obtain a lightness that is easy to work in a later process. The parameters of those processing are set in advance. However, when performing the contrast operation or the gamma characteristic operation, a contrast value or a gamma value is usually not operated in many cases. That is, the gamma value is 1.0, is applied linearly, and is often left unchanged.

After the processing of S264, the defect candidate detector 35a executes a finish processing such as a fine adjustment of the lightness of the belt image and a format conversion from the lightness group of the belt image to an image (S265), and ends the band-shaped noise removal process illustrated in FIG. 30.

FIG. 31 is a diagram illustrating an example of a belt image 45 obtained by processing the belt image 44 illustrated in FIG. 29B in the band-shaped noise removal process.

It can be seen that, in the belt image 45 illustrated in FIG. 31, the band-shaped or streak-shaped noise present in the belt image 44 illustrated in FIG. 29B is removed.

As described above, since the belt inspection system 30 according to the present variation specifies the inclination angle of the belt portion in the belt image (S221), it is possible to easily identify the position of a belt defect in an actual intermediate transfer belt, which is based on the coordinates position of the belt defect in the belt portion on the belt image.

Since the belt inspection system 30 according to the present variation executes shear deformation on the belt image in accordance with the inclination angle of the belt portion in the belt image (S222), even if the intermediate transfer belt on the belt image is sheared and deformed because the imaging device that has photographed the belt image is not installed parallel to the width direction of the intermediate transfer belt, a belt image equivalent to that when the imaging device is installed parallel to the width direction of the intermediate transfer belt can be obtained without adjusting the imaging device to be installed parallel to the width direction of the intermediate transfer belt.

The belt inspection system 30 according to the present variation subtracts, from the lightness of each pixel in a line, the average value of the lightness of the line, for all the lines of the belt image that has been subjected to the shear deformation in accordance with the inclination angle (S263). Therefore, the gap between the lines is reduced, and the band-shaped noise and the streak-shaped noise extending in the width direction of the intermediate transfer belt can be eliminated or suppressed, and as a result, the accuracy of belt defect detection can be improved.

If the average value of the lightness of the line to which each pixel belongs is subtracted from the lightness of each pixel, the lightness value becomes approximately 0.0, and the image is almost completely black, and the workability is poor. In addition, when the lightness value is approximately 0.0, a negative value is generated, and a computer can process but cannot display the belt image as an image, or even if the belt image is displayed, the workability is poor because it is not known what is drawn. However, the belt inspection system 30 subtracts the average value of the lightness of the line to which each pixel belongs from the lightness of each pixel (S263), and then applies a specific value to the lightness of each pixel (S264), and thus the workability can be improved. In doing so, the value applied to the lightness of each pixel is set to, for example, the average value of the entire screen of the intermediate transfer belt or the lightness that can be visually confirmed by an inspector. In that case, for example, the value applied to the lightness of each pixel may be set to gray of about 0.7 when the entire range from black to white is 1.0.

The belt inspection system 30 according to the present variation executes a processing (S201 to S203) for removing, from a belt image, a noise of a first size or smaller, which is smaller than the standard size of a belt defect such as a dark current noise and a photon noise and a noise of a second size or larger, which is larger than the standard size of a belt defect such as lens light falloff and in-plane unevenness, before the inclination angle specifying processing (S221), and thus the accuracy of specifying the inclination angle of the belt portion in the belt image can be improved.

The belt inspection system 30 according to the present variation detects a belt defect candidate from the belt image from which a noise of a first size or smaller, which is smaller than the standard size of a belt defect such as dark current noise and photon noise, and a noise of a second size or larger, which is larger than the standard size of a belt defect such as lens light falloff and in-plane unevenness are removed in S201 to S203 (S122 and S282). Thus, the accuracy of detecting a belt defect candidate can be improved, and as a result, the accuracy of belt defect detection can be improved.

The belt inspection system 30 according to the present variation determines pass/fail of quality of the intermediate transfer belt for the belt defect candidate with improved detection accuracy in accordance with a learning model (S123). Thus, the accuracy of pass/fail determination of the quality of the intermediate transfer belt is improved.

In addition, as is the case with the embodiment of the present disclosure, the belt inspection system 30 according to the present variation also generates a learning model for pass/fail determination of the quality of the intermediate transfer belt with the use of the belt defect candidate with improved detection accuracy (S284). Thus, the accuracy of pass/fail determination of the quality of the intermediate transfer belt is improved.

Next, another embodiment of the present disclosure will be described. The configuration of the image forming system of the present disclosure is also achieved by that a recording medium recording a program code of software that implements the functions of the aforementioned embodiment of the present disclosure and its variation is supplied to a system or an apparatus, and the computer of the system or apparatus reads and executes the program code recorded in the recording medium. In this case, the program code per se read from the recording medium implements the functions of the aforementioned embodiments, and the recording medium recording the program code constitutes the present disclosure. Furthermore, it goes without saying that, also included are, not only a case where the functions of the aforementioned embodiments are implemented by executing the program code read by the computer, but also a case where an operating system (OS) or the like running on the computer performs some or all of the actual processing on the basis of the instructions of the program code, and the functions of the aforementioned embodiments are thereby implemented.

What is claimed is:

1. A belt inspection system to detect a belt defect as an abnormal portion of an intermediate transfer belt of an image forming apparatus, the belt inspection system comprising
    a defect candidate detector that performs a preprocessing on a first belt image obtained by photographing the intermediate transfer belt to generate a second belt image and detects a candidate for the belt defect from the second belt image,
    wherein in the preprocessing, the defect candidate detector performs a noise removal processing to remove a specific noise included in the first belt image, the specific noise including noise caused by the photographing, and a noise of a specific size based on an average size of the belt defect,
    wherein the specific size includes a first size smaller than the average size of the belt defect and a second size larger than the average size of the belt defect, and the noise removal processing removes a noise of the first size or smaller and a noise of the second size or larger.

2. The belt inspection system according to claim 1, wherein the specific noise further includes a noise that extends in a width direction of the intermediate transfer belt and is caused by a production process of the intermediate transfer belt.

3. The belt inspection system according to claim 2, wherein the defect candidate detector performs the noise removal processing to obtain, from the first belt image by image shear deformation, an equivalent image as a belt image equivalent to a belt image obtained by photographing the intermediate transfer belt in a normal viewing state, and removes, from the equivalent image, a band-shaped or streak-shaped noise extending in the width direction of the intermediate transfer belt.

4. The belt inspection system according to claim 3, wherein, in order to obtain the equivalent image, the noise removal processing subjects the first belt image to provisional shear deformation at a provisional correction angle as an angle for provisional correction, specifies an inclination angle of a portion of the intermediate transfer belt from a plurality of provisional correction angles on a basis of a lightness value for each line of the first belt image subjected to provisional shear deformation, and performs shear deformation on the first belt image in accordance with the inclination angle specified.

5. The belt inspection system according to claim 1, further comprising a pass/fail determiner that determines pass/fail of quality of the intermediate transfer belt in accordance with a learning model with respect to the candidate detected by the defect candidate detector.

6. The belt inspection system according to claim 5, further comprising a learning model generator that generates the learning model with a use of the candidate detected by the defect candidate detector.

7. A belt inspection method for detecting a belt defect as an abnormal portion of an intermediate transfer belt of an image forming apparatus, the belt inspection method comprising:
    performing a preprocessing on a first belt image obtained by photographing the intermediate transfer belt to generate a second belt image, and
    detecting a candidate for the belt defect from the second belt image,
    wherein performing the preprocessing includes performing a noise removal processing to remove a specific noise included in the first belt image, the specific noise including a noise caused by the photographing, and a noise of a specific size based on an average size of the belt defect,
    wherein the specific size includes a first size smaller than the average size of the belt defect and a second size larger than the average size of the belt defect, and the noise removal processing removes a noise of the first size or smaller and a noise of the second size or larger.

8. A non-transitory computer-readable recording medium storing a belt inspection program that causes a computer to execute the belt inspection method according to claim 7.

9. A belt inspection system to detect a belt defect as an abnormal portion of an intermediate transfer belt of an image forming apparatus on a basis of a first belt image obtained by photographing the intermediate transfer belt, the belt inspection system comprising a defect candidate detector that performs a preprocessing on the first belt image and detects a candidate for the belt defect from a second belt image,
    wherein the preprocessing includes a noise removal processing for removing a noise caused by at least photographing of the intermediate transfer belt, and the noise removal processing includes a processing for removing a noise caused by the photographing, a noise of a specific size, from the first belt image in accordance with an average size of the belt defect,
    wherein the noise removal processing further includes a processing for removing a noise that extends in a width direction of the intermediate transfer belt and is caused by a production process of the intermediate transfer belt,
    the noise removal processing obtains, from the first belt image, an equivalent image as a belt image equivalent to a belt image obtained by photographing the intermediate transfer belt in a normal viewing state, and removes, from the equivalent image, a band-shaped or streak-shaped noise extending in the width direction of the intermediate transfer belt, and
    in order to obtain the equivalent image, the noise removal processing subjects the first belt image to provisional shear deformation at a provisional correction angle as an angle for provisional correction, specifies an inclination angle of a portion of the intermediate transfer belt from a plurality of provisional correction angles on a basis of a lightness value for each line of the first belt image subjected to provisional shear deformation, and performs shear deformation on the first belt image in accordance with the inclination angle specified.

* * * * *